(12) United States Patent
Chugo et al.

(10) Patent No.: US 6,731,604 B1
(45) Date of Patent: May 4, 2004

(54) TRANSMISSION APPARATUS, NETWORK TRANSMISSION SYSTEM, AND TRANSMISSION METHOD

(75) Inventors: Akira Chugo, Kanagawa (JP); Hidekazu Baba, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/114,516

(22) Filed: Jul. 14, 1998

(30) Foreign Application Priority Data

Jan. 14, 1998 (JP) .......................................... 10-005719

(51) Int. Cl.$^7$ .............................................. H04L 12/56
(52) U.S. Cl. .................................... 370/238; 370/238.1
(58) Field of Search ................................ 370/401, 469, 370/470, 471, 474, 428, 238, 238.1

(56) References Cited

U.S. PATENT DOCUMENTS

| | | | |
|---|---|---|---|
| 4,737,953 A | * | 4/1988 | Koch et al. |
| 5,426,637 A | * | 6/1995 | Derby et al. |
| 5,570,466 A | * | 10/1996 | Oechsle ................. 395/200.15 |
| 5,583,862 A | | 12/1996 | Callon |
| 5,649,108 A | * | 7/1997 | Spiegel et al. |
| 5,815,668 A | * | 9/1998 | Hashimoto ............. 395/200.68 |
| 5,920,697 A | * | 7/1999 | Masters et al. |
| 6,256,309 B1 | * | 7/2001 | Daley et al. ................. 370/395 |
| 6,363,319 B1 | * | 3/2002 | Hsu ........................... 701/202 |

FOREIGN PATENT DOCUMENTS

| | | |
|---|---|---|
| EP | 0652685 A | 5/1995 |
| WO | WO97/18637 | 5/1997 |

OTHER PUBLICATIONS

US 6,081,521, 6/2000, Chase et al. (withdrawn)*

* cited by examiner

Primary Examiner—Ken Vanderpuye
(74) Attorney, Agent, or Firm—Staas & Halsey LLP

(57) ABSTRACT

In a routing protocol control section, when a RIP frame related to a multipath at the same cost is received from each of networks, controls is provided, by a RIP deletion table control section, for deletion of any entry or for frame transmission following the entry (entries) according to whether destination information as well as the cost stored in the RIP deletion table are identified to those in the RIP frame or not for each entry in the RIP frame.

15 Claims, 29 Drawing Sheets

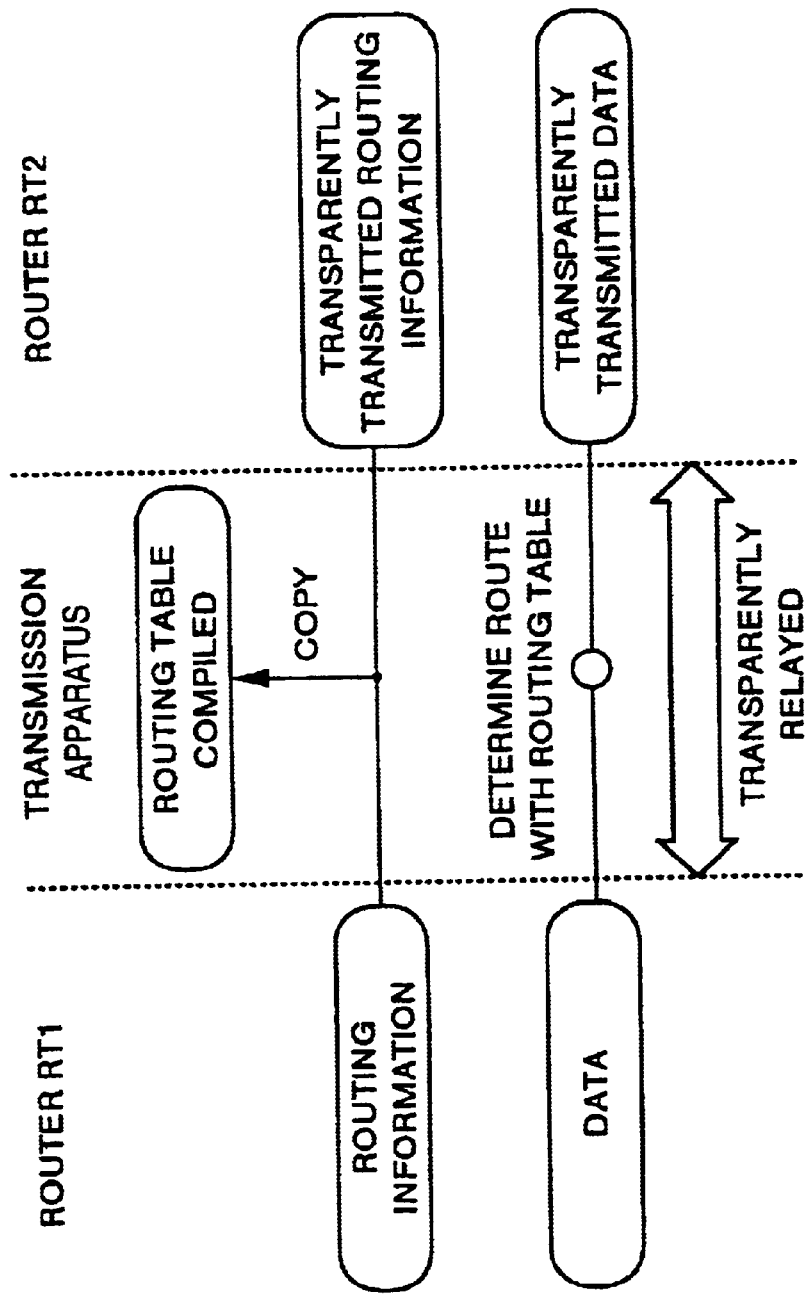

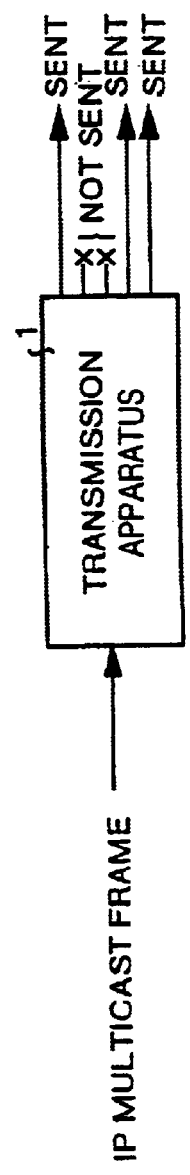

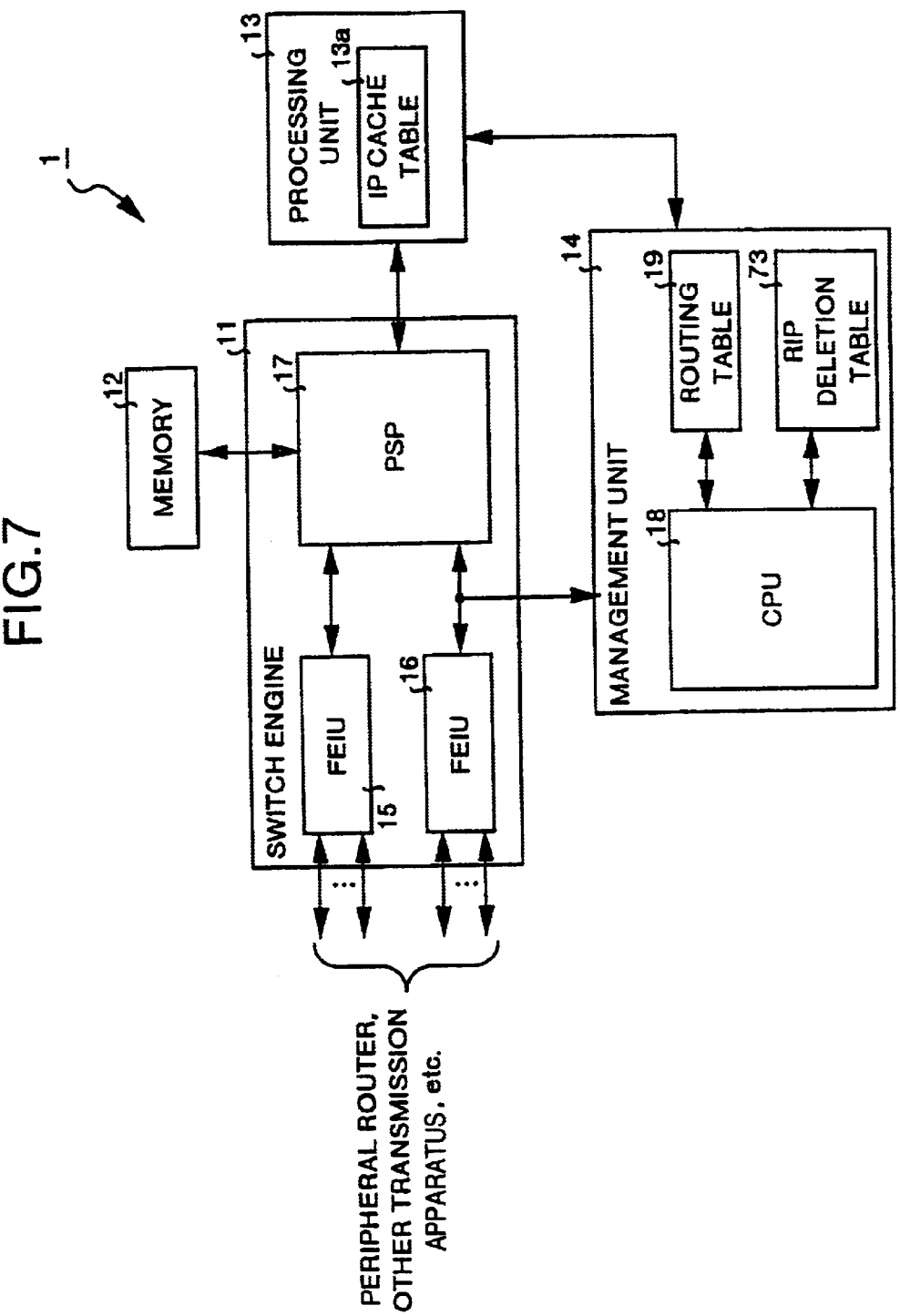

| DESTINATION IP SUBNET | CLOSEST PERIPHERAL ROUTER |
|---|---|
| B | A1 |
| C | A2 |

6A (TRANSMISSION APPARATUS 1)

| DESTINATION IP SUBNET | CLOSEST PERIPHERAL ROUTER |
|---|---|
| B | A1 |
| C | A2 |

6A (TRANSMISSION APPARATUS 20)

FIG.14A 6A (TRANSMISSION APPARATUS 1)

| DESTINATION IP SUBNET | CLOSEST PERIPHERAL ROUTER |
|---|---|
| B | A1 |
| C | A5 |

FIG.14B 6A (TRANSMISSION APPARATUS 30)

| DESTINATION IP SUBNET | CLOSEST PERIPHERAL ROUTER |
|---|---|
| B | A1 |
| C | A5 |

| DESTINATION IP SUBNET | DESTINATION IP ADDRESS FOR NEXT HOP | COST |
|---|---|---|
| C | A5 | 1 |
| ⋮ | ⋮ | ⋮ |

73

TRANSMISSION APPARATUS 1 | TRANSMISSION APPARATUS 20

INTERNAL RIP →

6B (TRANSMISSION APPARATUS 1)

| PERIPHERAL ROUTER | FRAME TRANSMISSION PORT |
|---|---|
| A1 | W |
| A2 | X1 |

6B (TRANSMISSION APPARATUS 20)

| PERIPHERAL ROUTER | FRAME TRANSMISSION PORT |
|---|---|
| A1 | Y1 |
| A2 | Z1 |

FIG.27A

| DESTINATION IP SUBNET | FRAME TRANSMISSION PORT |
|---|---|
| B | W |
| C | X1 |

19 (TRANSMISSION APPARATUS 1)

FIG.27B

| DESTINATION IP SUBNET | FRAME TRANSMISSION PORT |
|---|---|
| B | Y1 |
| C | Z1 |

19 (TRANSMISSION APPARATUS 20)

FIG.28A

| DESTINATION IP SUBNET | FRAME TRANSMISSION PORT |
|---|---|
| C2 | X1 |

13a (TRANSMISSION APPARATUS 1)

FIG.28B

| DESTINATION IP SUBNET | FRAME TRANSMISSION PORT |
|---|---|
| C2 | Z1 |

13a (TRANSMISSION APPARATUS 20)

| DESTINATION IP SUBNET | IP ADDRESS OF ROUTER FOR NEXT HOP OR IP ADDRESS OF TERMINAL WITHIN NETWORK | MAC ADDRESS OF ROUTER FOR NEXT HOP OR MAC ADDRESS OF TERMINAL WITHIN NETWORK |
|---|---|---|
| C | A2 | M4 |
| B | B1 | M2 |

FIG.29B

RTC1

| DESTINATION IP SUBNET | IP ADDRESS OF ROUTER FOR NEXT HOP OR IP ADDRESS OF TERMINAL WITHIN NETWORK | MAC ADDRESS OF ROUTER FOR NEXT HOP OR MAC ADDRESS OF TERMINAL WITHIN NETWORK |
|---|---|---|
| C | C2 | M6 |
| B | A1 | M3 |

TRANSMISSION APPARATUS, NETWORK TRANSMISSION SYSTEM, AND TRANSMISSION METHOD

FIELD OF THE INVENTION

The present invention relates to a transmission apparatus for connecting a plurality of LANs (Local Area Network) to each other and constructing a fast and high-capacity back bone network, a network transmission system for constructing a plurality of routes by connecting a plurality units of the transmission apparatus to each other, and to a transmission method for realizing a relay as a backbone with those transmission apparatus.

BACKGROUND OF THE INVENTION

FIG. 30 is a block diagram showing a network transmission system in a building for an ordinary business organization. Constructed in the building shown in FIG. 30 is a LAN using floors from a first basement to a third floor. Routers RT1, RT2, and RT3 are installed in the third floor, second floor, and first floor respectively, and those routers RT1, RT2, and RT3 are connected to a transmission apparatus 100 as a backbone for the routers installed in the first basement.

As for a system in each floor, a plurality of hubs HB1 . . . HBi (i: a natural number) are connected to the router RT1. A plurality of hubs, not shown through, are connected to each of the other routers RT2, and RT3 similarly to the router RT1. Terminals TL1 . . . TLj (j: a natural number) for a server or a work station or the like are connected together onto the hub HB1, and terminals PC1 . . . PCk (k=a natural number) connected together onto the hub HB2. It should be noted that the same system as the relation among the router, the hubs, and the terminals shown in the third floor is installed also in the first floor and the second floor.

The transmission apparatus 100 has also a plurality of hubs and terminals connected thereto under controls by its own like the routers RT1, RT2, and RT3 on each floor and also connects other transmission apparatus thereto.

Description is made for a case, as an example of operations in the network transmission system shown in FIG. 30, where the terminal TL1 in the third floor transmits data to any terminal in the second floor. A protocol to be used is a TCP (Transmission Control protocol)/IP (Internet Protocol) protocol as one example.

FIG. 31 is a view schematically showing a format of a frame (also called as a packet) used in the TCP/IP protocol. The frame comprises, as shown in FIG. 31, from the header to the end thereof, a start flag indicating a start of the frame, a MAC (Media Access Control) header for defining a destination MAC address and a source MAC address or the like, a type value for defining a protocol type, an IP header for defining a destination IP address and a source IP address or the like, a frame check sequence (FCS) for data and a checksum, and an end flag indicating an end of the frame.

Herein a MAC address and an IP address of a source terminal TL1 are MACA and IPA, and a MAC address and an IP address of a destination terminal are MACB and IPB, respectively. Further MAC addresses of the router RT1, the transmission apparatus 100 and the router RT2 provided for relaying data between the terminal TL1 and a destination terminal are MACC, MACD, and MACE respectively.

At first, the terminal TL1 prepares a frame according to the format shown in FIG. 31. Defined in the MAC header of the frame, during the preparation, is a MAC address (MACC) of the router RT1 through which the frame passes first of all when transferred to the destination terminal as a destination MAC address together with the MAC address (MACA) of the source terminal. Defined also in the IP header thereof is an IP address (IPB) of a destination terminal together with the IP address (IPA) of the source terminal.

When the frame is sent out onto a network by the terminal TL1, the frame is first received by the router RT1. This router RT1 extracts the IP header as well as the MAC header from the received frame. Further the router RT1 confirms from the IP header that the source terminal is the terminal TL1 (IPA) and the destination is a terminal having an IP address of IPB, and then rewrites the MAC header to MACD for the transmission apparatus 100 as the following MAC address. As described above, the router RT1 transmits the frame with the updated MAC header to the transmission apparatus 100 as a backbone.

The rewriting operation of the MAC header is also executed in the following transmission apparatus 100 and the router RT2. Namely, the MAC address is rewritten from MACD to MACE in the transmission apparatus 100, and the MAC address is rewritten from MACE to MACB in the router RT2. As described above, the MAC header is updated each time data passes through the router in data transmission through the router.

A large amount of traffic generated in each floor is concentrated to the transmission apparatus 100 in this network transmission system, which makes it necessary to select a transmission apparatus having a large capacity and high-speed capability.

There is, as a transmission apparatus with a large capacity capable of connecting a plurality of routers to each other, a combination of a switching hub with a router and a combination of an ATM (Asynchronous Transfer Mode) switch with a router other than the transmission apparatus 100 (router). FIG. 32 is a block diagram schematically showing a transmission apparatus constructed by a combination of a switching hub with a router, and FIG. 33 is a block diagram schematically showing a transmission apparatus constructed by a combination of an ATM switch with a router.

A transmission apparatus 200 shown in FIG. 32 has a router 201 and a switching hub 202 connected to each other. The switching hub 202 executes bridging among transfer paths a, b, c as well as among transfer paths d, e, f, and also performs switching between the transfer paths a, b, c and the transfer paths d, e, f. This switching hub 202 relays, if applied in an OSI (Open Systems Interconnection) layer, a layer corresponding to the layer 2 thereof. Namely, the switching hub 202 transparently relays, by selecting a route according to the MAC address, the frame flowing on the LAN.

Also, the router 201 receives the frame from the switching hub 202, rewrites data such as the MAC address, TTL (Time to Live), and a checksum to new ones, and returns the frame to the switching hub 202 (e.g., rewriting the MAC address from MACX to MACY). This router 201 relays, if applied an OSI layer, a layer corresponding to the layer 3 thereof. The router 201 receives, by selecting a route according to the IP address, the frame running on the LAN, rewrites the frame to new one, and then relays the rewritten frame to other LAN.

A transmission apparatus 300 shown in FIG. 33 has a server 302 and routers 303, 305 connected to an ATM switch 301. In FIG. 33, the router 303 positioned in the input side of the ATM switch 301 divides the frame into data units each called as a cell having a short fixed length by an ATM board 304 incorporated therein and transmits the units to the ATM switch 301. On the other hand, the router 305 positioned in the output side of the ATM switch 301 returns each cell to the frame by an ATM board 306 incorporated therein and then transmits the frame.

The ATM switch 301 relays, if applied in the OSI layer, layer corresponding to the layer 1 thereof according to the cells running between the routers 303 and 305. This ATM switch 301 selects a destination router (route) with a support by the server 302 in which the destination information is stored. Namely, a route is selected by an identifier unitrarily allocated thereto and specific to the ATM in the ATM switch 301. In this example, the destination router is the router 305.

In the transmission apparatus 200 shown in FIG. 32, however, the frame is rewritten at the router 201 when passing therethrough even if the switching hub 202 can transparently pass the frame therethrough. For this reason, it is satisfactory in the functional aspect that the layer as far as the layer 3 can be covered, but reduction of a processing speed as a whole can not be avoid.

Accordingly, the transmission apparatus 200 has only low performance as a backbone transmission apparatus that requires high-speed capability. To avoid this problem, a large increase in cost is forced, which makes it difficult to be realized.

Also, in the transmission apparatus 300 shown in FIG. 33, the router 303 and 305 or the like connected to the ATM switch 301 execute conversion processing between a frame and cells even transparency is obtained in the area of ATM switch 301, so that an increase in cost per interface can not be prevented. For this reason, the transmission apparatus 300 has only a system obtained by distributing a load onto periphery of the ATM switch 301 so that the load on the ATM switch 301 itself is reduced, and for this reason the system as a whole is comparatively costly.

In order to solve the problems described above, it is necessary to construct a network transmission system which has both functions of the transmission apparatus 200 and 300, namely which can be completely transparent to a frame passing therethrough with low cost and high speed.

Consideration is made for the network transmission system for realizing this transmission completely transparent to a frame. FIG. 34 shows a network transmission system for coupling a plurality of transmission apparatus each of which is completely transparent to a frame passing therethrough to each other with a tree structure or a loop structure (a triangle structure as an example) and generating a plurality of routes when a relay is performed with this plurality of transmission apparatus.

In FIG. 34, each of transmission apparatus 401, 402, and 403 which can be completely transparent to a frame is connected to the other two transmission apparatuses. The transmission apparatus 401 is connected to a subnet SNC via a router RTC1, and the transmission apparatus 402 is connected to the subnet SNC via a router RTC2. Further connected to the subnet SNC is, for example, a terminal TLC. Also, the relay 403 is connected to a subnet SNB via the router RT1. Further connected to the subnet SNB is, for example, the terminal TL1.

When a frame is transmitted from the terminal TL1 of the subnet SNB to the terminal TLC of the subnet SNC in the network transmission system shown in FIG. 34, there are two types of route such as a route A and a route B. In the route A, a frame sent out from the terminal TL1 arrives the terminal TLC through the router RT1, transmission apparatus 403, transmission apparatus 401, and router RTC1. In the route B, on the other hand, a frame sent out from the terminal TL1 arrives the terminal TLC through the router RT1, transmission apparatus 403, transmission apparatus 402, and router RTC2.

In the route A, as described above, the transmission frame to pass through the transmission apparatus 403 and 401 is completely and transparently passed therethrough without being rewritten. For this reason, the frame transmission can maintain its high-speed capability even when having passed through the transmission apparatus 403 and 401. Similarly, in the route B, the transmission frame to pass through the transmission apparatus 403 and 402 is completely and transparently passed therethrough without being rewritten. For this reason, the frame transmission can maintain its high-speed capability even when having passed through the transmission apparatus 403 and 402.

However, in the network transmission system for realizing transmission completely transparent to a frame passing therethrough as shown in FIG. 34, under the condition of forming a multipath at the same cost, namely, under the condition where each of the route A and the route B from the terminal TL1 to TLC passes through a router only once, so that cost of the communication for each route is the same, but in the state where two routes A and B exist, a router as a next hop in peripheral routers in each routes is different according to an arriving order of frames each for a routing protocol, table preparation with the frames each for a routing protocol, and to a difference in versions of updated control programs.

Namely, in those cases, the contents of an external routing table held by the transmission apparatus 403 for relaying the two routes A, and B as a multipath each at the same cost is differentiated from the contents held by peripheral routers of the router RT1, which may cause communications through the transmission apparatus 403 to be incorrectly executed.

For example, if the route A is selected in the transmission apparatus 403 and the route B is selected by the router RT1, the router RT1 sends the frame to the router RTC2, but the transmission apparatus 403 sends the frame to the router RTC1, and the frame can not be received by the router RTC1. Namely, as the router RT1 adds a destination MAC address for the router RTC2 to the frame, the router RTC1 abandons the frame because the destination MAC address is recognized as not for the router.

SUMMARY OF THE INVENTION

It is a first object of the present invention to obtain, for the purpose of solving the problems based on the conventional technology, a transmission apparatus enabling realization of high-reliability communications by maintaining the compatibility with each routing even under the condition of forming a multipath at the same cost for realizing cost performance of the apparatus as a whole without being restricted to the transmission method applied to the OSI layers based on the conventional technology.

It is a second object of the present invention to obtain, for the purpose of solving the problems based on the conventional technology, a network transmission system enabling constriction of a high-reliability system by applying there in the transmission apparatus which can achieve the first object.

It is a third object of the present invention to obtain, for the purpose of solving the problems based on the conventional technology, a transmission method, in which relaying as a backbone can be performed so as to enable realization of cost performance of the apparatus as a whole without being restricted to the transmission method applied to the OSI layers based on the conventional technology, enabling realization of high-reliability communications by maintaining the compatibility with each routing even under the condition of forming a multipath at the same cost.

With the transmission apparatus according to the present invention, a plurality of routes are previously formed in the network transmission system, and if there exists information concerning a plurality of routes each constituting a multipath each at the same cost of the route information including cost information stored in correlation to the destination information, by using information for any one of the plurality of routes, the route is fixedly used for relaying, so that a unique route is notified to networks connected to each other through the transmission apparatus so that information for only one route can be identifiable, and with this feature, it is possible to realize high-reliability communications by maintaining the compatibility with each routing even under the condition of forming a multipath at the same cost for realizing cost performance of the apparatus as a whole without being caught by the transmission method applied to the OSI layers based on the conventional technology.

With the transmission apparatus according to the present invention, a plurality of routes are previously formed in the network transmission system, and when information concerning a plurality of routes each constituting a multipath each at the same cost is constructed by received control information, information for a route to be used for relaying is constructed according to information for any one of the plurality of routes, so that a unique route can be given to the system even if a plurality of routes constituting a multipath each at the same cost exist, and with this feature, it is possible to realize high-reliability communications by maintaining the compatibility with each routing even under the condition of forming a multipath at the same cost for realizing cost performance of the apparatus as a whole without being caught by the transmission method applied to the OSI layers based on the conventional technology.

With the transmission apparatus according to the present invention, a plurality of routes are previously formed in the network transmission system, and when information concerning a plurality of routes constituting a multipath each at the same cost is constructed by a received routing protocol, information for a route to be used for relaying is constructed according to information for any one of the plurality of routes, so that a unique route can be given to the system even if a plurality of routes constituting a multipath each at the same cost exist, and with this feature, it is possible to realize high-reliability communications by maintaining the compatibility with each routing even under the condition of forming a multipath at the same cost for realizing cost performance of the apparatus as a whole without being caught by the transmission method applied to the OSI layers based on the conventional technology.

With the transmission apparatus according to the present invention, of information concerning a plurality of routes constituting a multipath each at the same cost, a routing table is constructed according to route information for giving permission of a relay, and also constructs a non-routing table according to route information for not giving permission of a relay. With this feature, of the information concerning a plurality of routes constituting a multipath each at the same cost, a frame can be transmitted only through a unique route according to the routing table, and route information for the other routes is deleted according to the non-routing table, so that it is possible to coincide contents of a routing table in a peripheral router with contents of a routing table in a transmission apparatus.

With the transmission apparatus according to the present invention, when the route information included in the received frame is included in the non-routing table, the route information is deleted and the frame without the route information is transmitted, so that the information concerning a plurality of routes constituting a multipath each at the same cost having existed at the time of reception thereof disappears at the stage of frame transmission, and a unique route on the system can be notified to the network.

With the network transmission system according to the present invention, a plurality of routes are previously formed with a tree structure or a loop structure comprising a plurality of replay apparatuses in the network transmission system, and when information concerning a plurality of routes constituting a multipath each at the same cost exists among the route information including cost information stored in correlation to the destination information in each of the transmission apparatus, the frame is fixedly relayed by using information for any one of the plurality of routes, so that a unique route is notified to networks connected to each other through the transmission apparatus so that only one route information can be identifiable, and with this feature, it is possible to construct a high-reliability system by maintaining the compatibility with each routing even under the condition of forming a multipath at the same cost for realizing cost performance of the system as a whole without being caught by the transmission method applied to the OSI layers based on the conventional technology.

With the network transmission system according to the present invention, a plurality of routes are previously formed with a tree structure or a loop structure comprising a plurality of replay apparatuses in the network transmission system, and when information concerning a plurality of routes constituting a multipath each at the same cost is constructed by the received control information in each of the transmission apparatus, information for a route to be used for relaying is constructed according to information for any one of the plurality of routes, so that a unique route can be given to the system even if a plurality of routes constituting a multipath each at the same cost exist, and with this feature, it is possible to construct a high-reliability system by maintaining the compatibility with each routing even under the condition of forming a multipath at the same cost for realizing cost performance of the system as a whole without being caught by the transmission method applied to the OSI layers based on the conventional technology.

With the network transmission system according to the present invention, a plurality of routes are previously formed with a tree structure or a loop structure comprising a plurality of replay apparatuses in the network transmission system, and when information concerning a plurality of routes constituting a multipath each at the same cost is constructed by the received routing protocol in each of the transmission apparatus, information for a route to be used for relaying is constructed according to information for anyone of the plurality of routes, so that a unique route can be given to the system even if a plurality of routes constituting a multipath each at the same cost exist, and with this feature, it is possible to construct a high-reliability system by maintaining the compatibility with each routing even under the condition of forming a multipath at the same cost for realizing cost performance of the system as a whole without being caught by the transmission method applied to the OSI layers based on the conventional technology.

With the transmission method according to the present invention, there are steps of executing, when having received the frame related to the multipath at the same cost from each of the networks, deletion of any of entries in the received frame or transmission of the frame following the entry (entries) according to whether destination information as well as the cost for each of the entries are identified to those in the routing table or not, so that frame transmission through a multipath at the same cost can be controlled for each route according to the destination, and with this feature, it is possible to realize high-reliability communications by maintaining the compatibility with each routing even under the condition of forming a multipath at the same cost.

Other objects and features of this invention will become understood from the following description with reference to the accompanying drawings.

BRIEF DESCRIPTION OF THE DRAWINGS

FIG. 4 is a view for explaining a flow of a frame in the network transmission system according to one embodiment;

FIGS. 5A and 5B are views each showing an example of frame transmission to ports when a IP multi cast frame is relayed; FIG. 5A is an explanatory view of the example based on the conventional technology, and FIG. 5B is an explanatory view of one embodiment;

FIG. 6A is an explanatory view of the principle based on the conventional technology, and FIG. 6B is an explanatory view of one embodiment;

FIG. 7 is a block diagram showing the hardware of the transmission apparatus according to one embodiment;

FIG. 13A is a view showing one example of the external routing table in one of transmission apparatus, and FIG. 13B is a view showing one example of the external routing table in another one of the transmission apparatus;

FIGS. 14A and 14B are views each showing one example of contents stored in an external routing table in a second routing in the network transmission system shown in FIG. 9, FIG. 14A is a view showing one example of the external routing table in one of transmission apparatus, and FIG. 14B is a view showing one example of the external routing table in another one of the transmission apparatus;

FIG. 22A is a view showing one example of the internal routing table in one of transmission apparatus, and FIG. 22B is a view showing one example of the internal routing table in another one of the transmission apparatus;

FIGS. 27A and 27B are views each showing one example of contents stored in a routing table in the network transmission system according to one embodiment, FIG. 27A is a view showing one example of the routing table in one of transmission apparatus, and FIG. 27B is a view showing one example of the routing table in another one of the transmission apparatus;

FIGS. 28A and 28B are views each showing one example of contents stored in an IP cache table in the network transmission system according to one embodiment, FIG. 28A is a view showing one example of the IP cache table in one of transmission apparatus, and FIG. 28B is a view showing one example of the IP cache table in another one of the transmission apparatus;

FIGS. 29A and 29B are views each showing one example of contents stored in the routing table of a router connected to a transmission apparatus in the network transmission system according to one embodiment;

DESCRIPTION OF THE PREFERRED EMBODIMENT

Detailed description is made for preferred embodiments of a transmission apparatus, a network transmission system, and a transmission method according to the present invention with reference to the related drawings.

Figure 1:
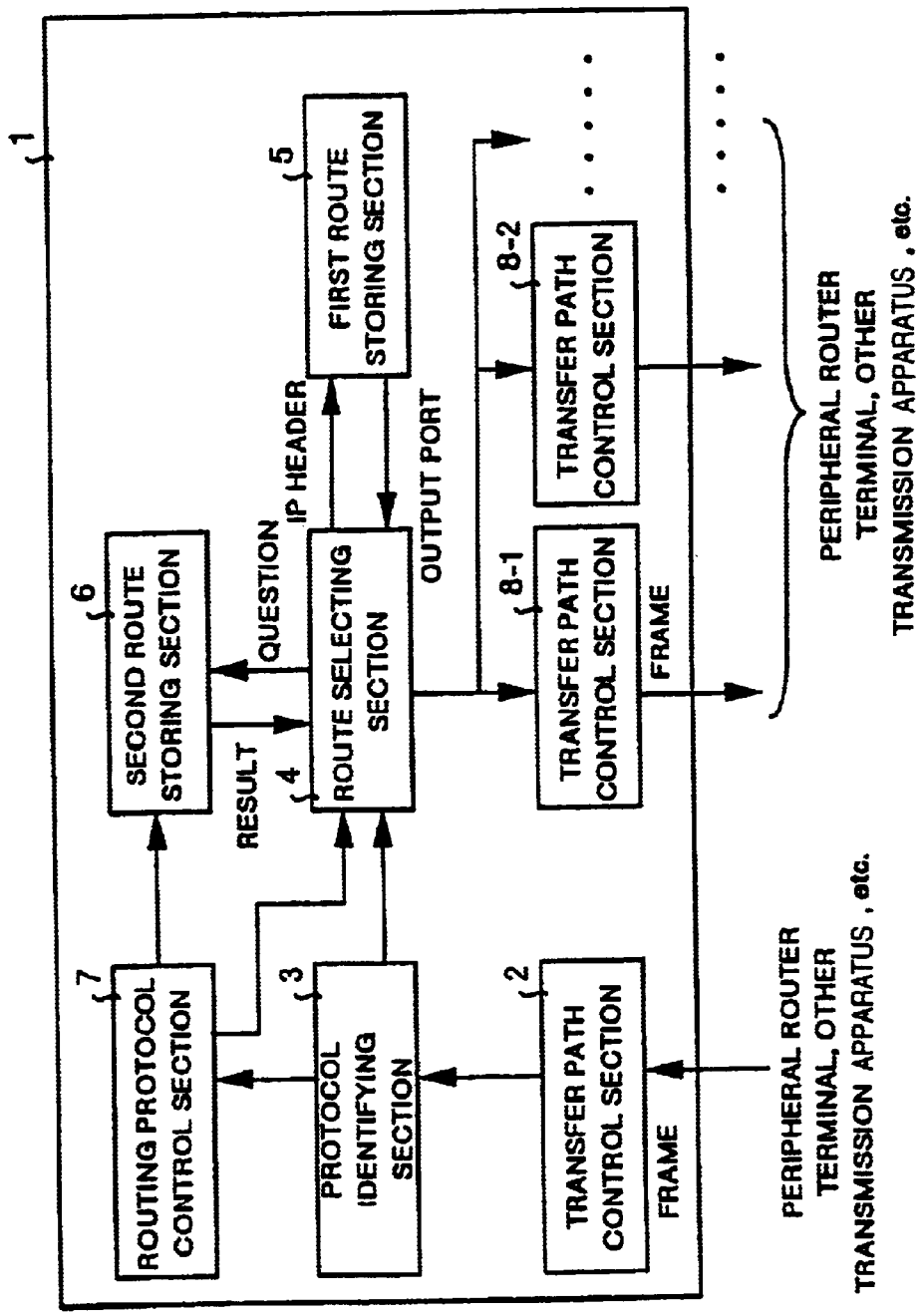
FIG. 1 is a block diagram functionally showing the transmission apparatus according to one embodiment of the present invention.
Figure 2:
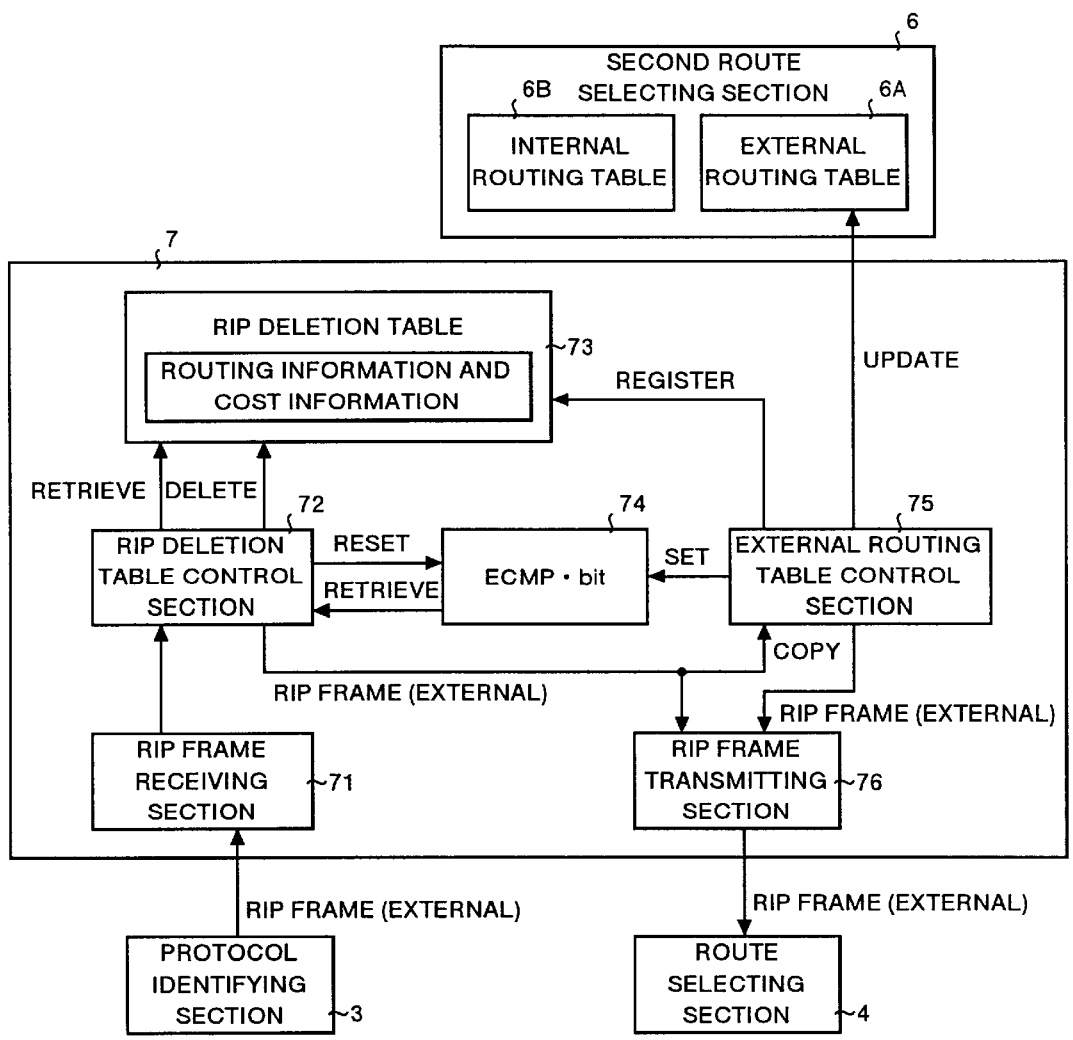
FIG. 2 is a block diagram showing internal configuration of the routing protocol control section shown in FIG. 1.

At first, description is made for the basic principles of the present invention with reference to FIG. 1 and FIG. 2. FIG. 1 is a block diagram functionally showing a transmission apparatus according to one embodiment of the present invention. The transmission apparatus 1 shown in FIG. 1 comprises a transfer path control section 2, a protocol identifying section 3, a route selecting section 4, a first route storing section 5, a second route storing section 6, a routing protocol control section 7, and a transfer path control section 8. It should be noted that a format of a frame used in this network transmission system follows the format in FIG. 31 as described above.

The transfer path control sections 2, 8-1, 8-2 . . . are connected to a plurality of LANs (peripheral routers, other transmission apparatus having the same function and a terminal for the route of the apparatus or the like) not shown, and the transfer path control section 2 as one of the routes receives each frame on the LANs, while the other transfer path control sections 8-1, 8-2 . . . transmit each frame onto the LANs each having a route selected by the route selecting section 4.

The protocol identifying section 3 identifies a frame received through the transfer path control section 2, and determines whether a type of the frame is an ARP (Address Resolution Protocol), a routing protocol (e.g., RIP (Routing Information Protocol) or OSPF (Open Shortest Path First)), or ordinary data (a frame as an object to be relayed). This protocol identifying section 3 sends out, when having identified the routing protocol according to the received frame, the received frame only to the routing protocol control section 7, and sends out, when having identified the ordinary data, the received frame only to the route selecting section 4. It should be noted that, when the received frame is the routing protocol, routing information should be included in the frame.

The route selecting section 4 extracts an IP header from the received frame, retrieves destination information for a layer 3, namely an IP address as a key in the first route storing section 5, receives the route information obtained by the retrieval, namely an output port, and sends out the received frame as it is to a transfer path (transfer path control section 8) corresponding to the output port.

The first route storing section 5 is a routing table with IP addresses of the layer 3 each indicating a destination on each LAN and output ports each indicating an output route correlated to each other and stored therein, receives an IP address, and outputs an output port. The second route storing section 6 is also a routing table, similar to the first route storing section 5, with IP addresses of the layer 3 each indicating a destination on each LAN and output ports each indicating an output route correlated to each other and stored therein, and is used when an output port correlating to an IP address can not be obtained in the first route storing section 5.

The routing protocol control section 7 checks a received frame, extracts routing information from the frame, and constructs (newly constructs, or changes or the like) a correlation between an IP layer of the second route storing section 6 and an output port.

Figure 3:
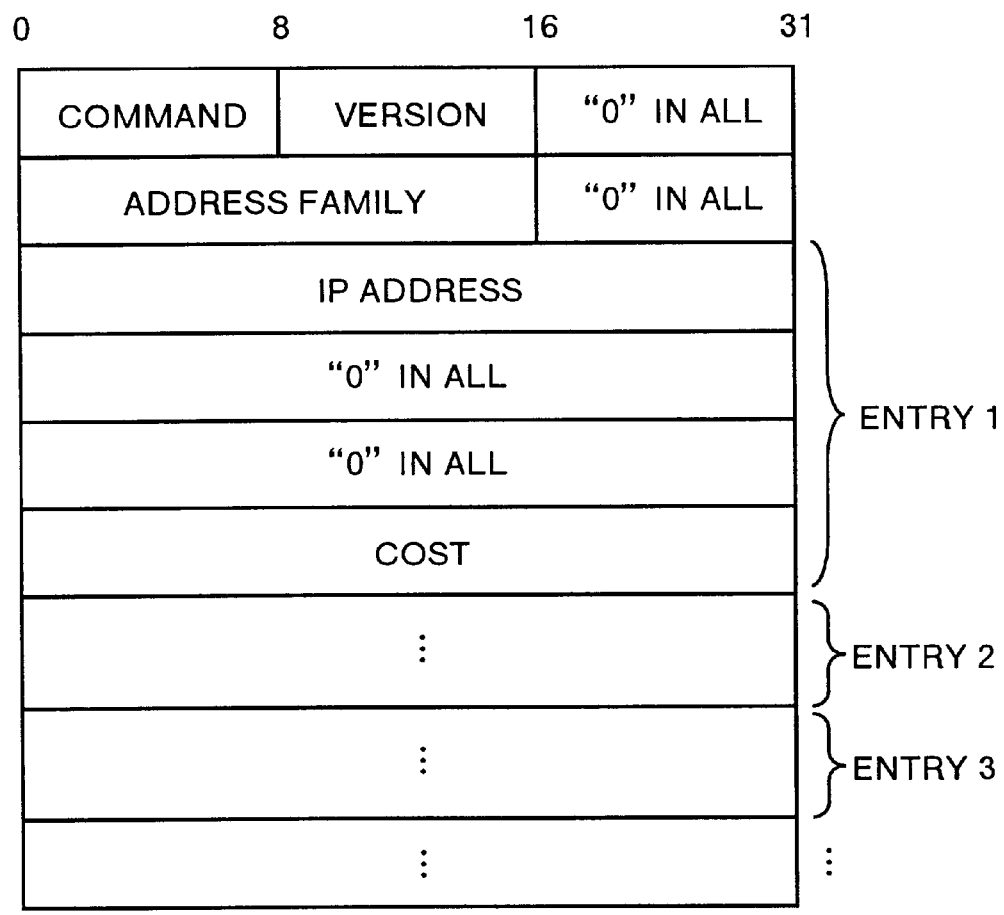
FIG. 3 is a view showing a format of a RIP packet.

Next detailed description is made for the routing protocol control section 7. FIG. 2 is a block diagram showing internal configuration of the routing protocol control section in the transmission apparatus shown in FIG. 1, and FIG. 3 is a view showing a format of a RIP packet.

The second route storing section 6 has an external routing table 6A and an internal routing table 6B. The external routing table 6A is constructed based on routing information to be copied for relaying, namely a result of RIP snooping described later. The internal routing table 6B is constructed based on routing information to be exchanged in a packet form between the transmission apparatus 1 and some other transmission apparatus having the same function, namely an internal RIP described later.

The routing protocol control section 7 comprises, as shown in FIG. 2, a RIP frame receiving section 71, a RIP deletion table control section 72, a RIP deletion table 73 as a non-routing table, an ECMP·bit 74, an external routing table control section 75, and a RIP frame transmitting section 76.

The RIP frame receiving section 71 connected to the protocol identifying section 3 shown in FIG. 1 receives a RIP frame from the protocol identifying section 3, and transfers the frame to the RIP deletion table control section 72. The RIP deletion table control section 72 provides controls for retrieving or deleting any table entry in the RIP deletion table 73, copying the received RIP frame to the external routing table control section 75, or for transmitting the frame to the RIP frame transmitting section 76.

Stored in the RIP deletion table 73 is routing information not having been selected of routing information indicating a different route at the same cost under the control by the external routing control section 75. Routing information in a RIP frame coincident with any of the routing information stored in this RIP deletion table 73 is deleted without being relayed. The ECMP·bit 74 indicates whether any multipath at the same cost for the received RIP frame is detected or not. Setting of this ECMP·bit 74 indicates that the multipath at the same cost has been detected, and on the other hand, resetting of the ECMP·bit 74 indicates that the multipath at the same cost has not been detected.

The external routing table control section 75 provides controls for updating the external routing table 6A or for storing any table entry into the RIP deletion table 73 according to the RIP frame copied from the RIP deletion table control section 72. The RIP frame transmitting section 76 receives the RIP frame sent out from the RIP deletion table control section 72 or from the external routing table control section 75 and transmits the frame to the route selecting section 4.

Description is made herein for a format of a RIP packet. The RIP packet comprises, as shown in FIG. 3, a unit of 32 bits (called as 1 field). Stored in a first field are a command, a version, and all "0", and an address family and "0" in all are stored in the next field. Further stored in the following four fields are an IP address as a destination (a destination IP subnet), "0" in all, "0" in all, and a cost for a route up to the destination IP address respectively, and a pattern comprising those four fields is made as an entry for one route information, and then this pattern is continued thereafter and on like Entry 1, 2, 3 . . . .

The RIP packet is used when a router having just started up refers to adjacent routers for route information to obtain routing information. As the uses of the packet, there are two types of a case (a) of obtaining route information for a particular destination and a case (b) of obtaining information for all routes.

In the case of (a), a destination address for which the route information is to be acquired is stored in the field of IP address following the field of Address family. In the case of (b), "0" is stored in Address family.

Figure 30:
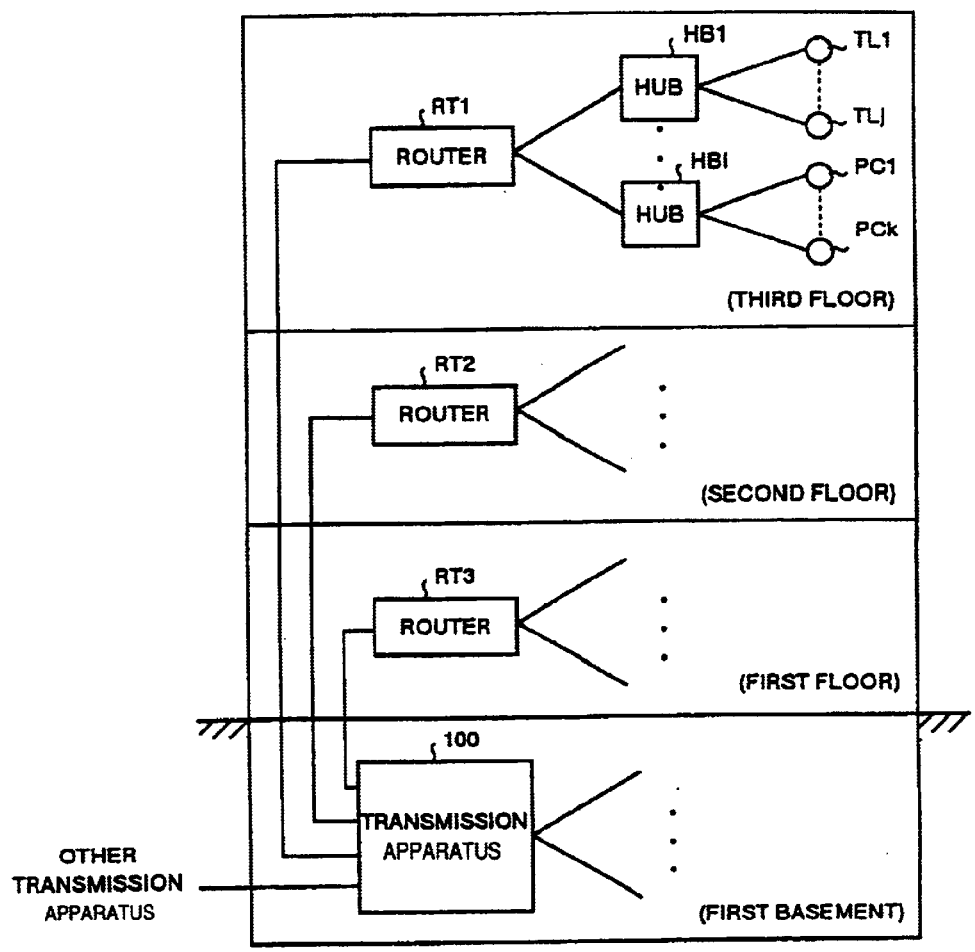
FIG. 30 is a block diagram showing a network transmission system in an ordinary company.

Next description is made for a function of transmission completely transparent with reference to the functional blocks shown in FIG. 1. FIG. 4 is a view for explaining a flow of a frame in the network transmission system according to the embodiment of the present invention. Description assumes a case as an example where the transmission apparatus 1 is placed in stead of the transmission apparatus 100 in the network transmission system in a state of the connection shown in FIG. 30. Accordingly, it is assumed, to make the description simpler, that the routers RT1 and RT2 are connected to the transmission apparatus 1 as shown in FIG. 4.

Description is made for a case where a received frame is ordinary data (a frame as an object to be relayed). When ordinary data (a frame as an object to be relayed) is transmitted from the router RT1 to the router RT2 through the transmission apparatus 1, the frame sent from the router RT1 is first received by the transmission apparatus 1. Since the received data is ordinary data, it is identified that the received frame is ordinary data by the protocol identifying section 3 in this transmission apparatus 1. In this case, the route selecting section 4 searches the routing table in a first stage, namely the first route storing section 5 with the IP address in the received frame as a key.

In the route selecting section 4, as a result of the retrieval, when it is recognized that an output port corresponding to the IP address has been stored, the received frame is sent out to the router RT2 through the transfer path control section 8 so that the received frame can be transmitted through a transfer path (LAN including the router RT2) corresponding to the output port. During the transmission, as shown in FIG. 4, the ordinary data sent from the router RT1 is transmitted to the router RT2 by being transparently relayed through the transmission apparatus 1.

It should be noted that, when the search of the first route storing section 5 fails to find a target output port, an output port corresponding to the IP address is to be acquired further by searching the second route storing section 6 as a second stage. A relation between the IP address incapable of being acquired from the first route storing section 5 and the output port corresponding thereto is routing information of which the first route storing section 5 is short, so that the routing information is stored anew in the first route storing section 5.

Next description is made for a case where a received frame is a routing protocol sent from any existing device (peripheral apparatus or the like such as a router and a terminal). When a routing protocol (routing information) is transmitted from the router RT1 to the router RT2 through the transmission apparatus 1, similarly to the ordinary data, the frame sent from the router RT1 is first received by the transmission apparatus 1. Since the received frame is a routing protocol, it is identified that the received frame is a routing protocol from a value for the type in the frame by the protocol identifying section 3 in this transmission apparatus 1.

In this case, the received frame is outputted to the routing protocol control section 7 through the protocol identifying section 3. The received frame is copied once in the routing protocol control section 7, and then outputted to the route selecting section 4. The received frame outputted to the route selecting section 4 is sent out, to be sent out to all routes for transmission excluding the route having received the frame, differently from the relay operation according to the ordinary data, to the router RT2. On the other hand, when the received frame is sent to the routing protocol control section 7, as shown in FIG. 4, a routing table in the second route storing section 6 is constructed (newly constructed, or changed or the like) by being copied from the routing protocol in the received frame under the controls by the routing protocol control section 7.

Also, the routing protocol control section 7 checks, when any update in the table occurs in the second route storing section 6, correlation between the updated contents and the contents stored in the first route storing section 5, and then the stored contents corresponding to the updated portion is deleted from the routing table of the first route storing section 5. As described above, the contents stored in the second route storing section 6 can immediately be reflected to the first route storing section 5. The reflection means here that earlier contents corresponding to that having been updated in the second route storing section 6 is not kept in the first route storing section 5.

As described above, construction of a routing table by not only transparently relaying a routing protocol (routing information) but also acquiring (copying) the routing protocol by the transmission apparatus 1 itself for a relay is a function which even any existing switching hub capable of transparently relaying a frame does not obtain. In contrast, any existing router constructs a routing table from a routing protocol for a relay, but does not have a function of transparently relaying a frame, which causes the performance thereof to be reduced.

Next description is made for a case where a received frame is a routing protocol sent from a transmission apparatus having the same configuration and functions as those in the transmission apparatus 1. As a method of differentiating between a routing protocol sent from the existing device and a routing protocol sent from any transmission apparatus equivalent to the transmission apparatus 1, the following methods (1) and (2) are conceivable as an example.

(1) A protocol number (e.g., a port number of a UDP (User Datagram Protocol) in a case of IP or the like) may be set to a different number from that of an ordinary routing protocol.

(2) Information for all destinations (e.g., IP address) of each layer 3 in all transmission apparatus each corresponding to the transmission apparatus 1 has been stored by setting, and if it is determined that a received frame is a frame with information for one of those destinations as a source, a routing table is constructed as a routing protocol from the transmission apparatus corresponding to the transmission apparatus 1, and in this case, the frame is rewritten and transferred to the next transmission apparatus. As for this rewriting, the same sequence of processing as that of the existing router is required.

Then, comparison is made for multi-cast of the IP between the conventional type of switching hub and the transmission apparatus 1 according to the present invention. FIGS. 5A and 5B show, when a IP multi cast frame is relayed, examples of transmission of the frame to ports, in which FIG. 5A is an explanatory view of the example based on the conventional technology, and FIG. 5B is an explanatory view of the example according to the embodiment.

In the conventional type of switching hub, as MAC addresses in the received IP multi cast frame are broadcast addresses, concurrent transmission of the frame is executed to all the ports (five ports as an example) (Refer to FIG. 5A). While in the transmission apparatus 1, an output port is selected according to the IP address in the received IP multi cast frame, and for this reason, transmission of the frame is performed only to a particular multi cast group (three output ports of five ports as an example) (Refer to FIG. 5B).

Figure 6A:
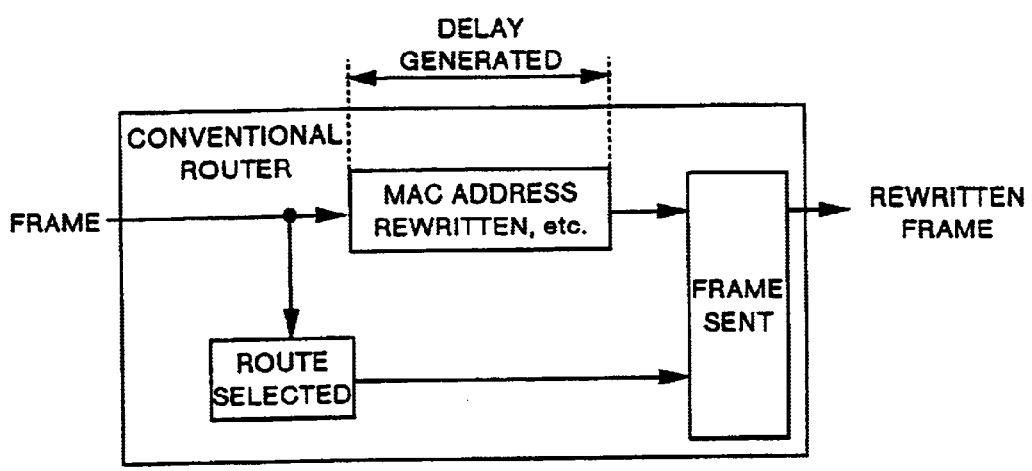
FIGS. 6A and 6B are views for explaining principles of relaying a frame.
Figure 6B:
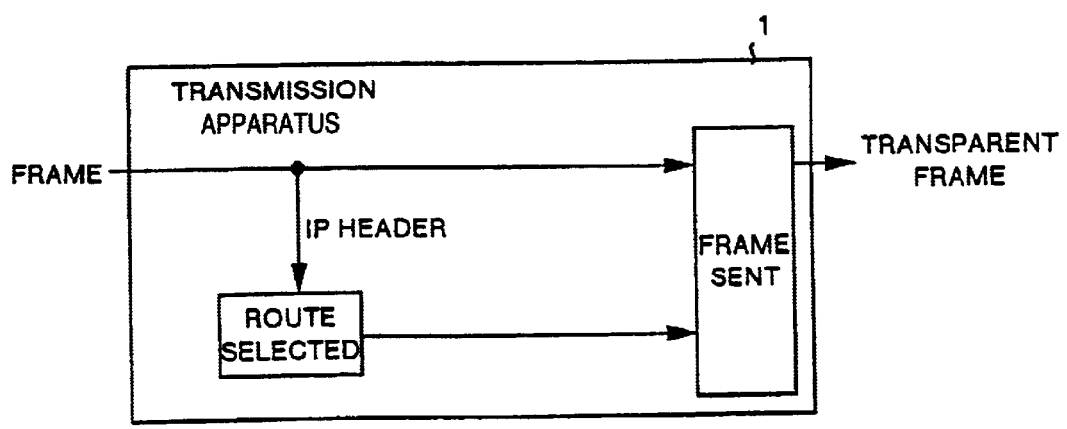

Comparison is further made for relay principles between the conventional type of router and the transmission apparatus 1 according to the present invention. FIGS. 6A and 6B show principles of relaying a frame, in which FIG. 6A is an explanatory view of the principle based on the conventional technology, and FIG. 6B is an explanatory view of the principle according to the embodiment.

The conventional type of router executes processing for rewriting an MAC address, subtracting TTL, and rewriting a checksum or the like according to the received frame since a route is selected by an IP header in the received frame till the frame is transmitted, so that a delay occurs, which causes a fast relay to be prevented (Refer to FIG. 6A). In contrast, in the transmission apparatus 1, a received frame is transmitted as it is as soon as a route is selected by an IP header in the received frame, so that the frame can transparently be relayed through the apparatus with high speed without occurrence of the delay shown in FIG. 6A (Refer to FIG. 6B).

Next description is made for this embodiment with reference to hardware thereof. FIG. 7 is a block diagram showing the hardware of the transmission apparatus 1. The transmission apparatus 1 shown in FIG. 7 comprises a packet switch engine (called as a switch engine hereinafter) 11 with a memory 12 for temporarily storing therein a received frame, a processing unit 13 for executing retrieval according to a routing table at a hardware level, and with a management unit 14 for executing retrieval according to the routing table at a software level each connected to the engine. There is shown here an example of applying the transmission apparatus to Ethernet.

The switch engine 11 comprises a fast Ethernet interface unit in a reception side (called as FEIU (Fast Ethernet Interface Unit) hereinafter) 15, a FEIU 16 in a transmission side, and a packet switch processor (called as PSP (Packet Switch Processor) hereinafter) 17.

The FEIUs 15 and 16 is connected to a plurality of LANs based on the Ethernet and have functions corresponding to the transfer path control sections 2 and 8 in the functional blocks in FIG. 1 respectively. The PSP 17 is connected to the FEIUs 15, 16, memory 12, processing unit 13 and the management unit 14, and provides controls for the entire relay operations. This PSP 17 has functions corresponding to the protocol identifying section 3 as well as to the route selecting section 4 in the functional blocks in the FIG. 1.

This PSP 17 provides controls for writing/reading a received frame in/from the memory 12, retrieving route information by using an IP cache table 13a (corresponding to a routing table at the first stage) in the processing unit 13, and constructing a routing table 19 (corresponding to a routing table at the second stage) in the management unit 14 in cooperation with the management unit 14.

The memory 12 is a high capacity storing unit for writing and reading received data therein/therefrom according to controls by the PSP 17 of the switch engine 11. The processing unit 13 has the IP cache table 13a so that route information can be retrieved with destination information (IP address) for the received frame as a key and has a function corresponding to the first route storing section 5 in the functional blocks in FIG. 1. This processing unit 13 refers to, when information for a particular route can not be acquired by retrieving the route in the IP cache table 13a according to a request from the PSP 17, the management unit 14 for the route, and correlates, if there is information for the particular route in the routing table 19, the route information to the destination information as a key and stores the information in the table 13a.

The management unit 14 comprises a CPU 18, the routing table 19 constructed in the unit so as to be capable of being updated, and the RIP deletion table 73. The CPU 18 and the routing table 19 have functions corresponding to the routing protocol control section 7 as well as to the second route storing section 6 in the functional blocks in FIG. 1 respectively. The RIP deletion table 73 is shown separately from the CPU 18 as far as hardware thereof is concerned although the table is provided in the routing protocol control section 7 in the functional blocks in FIG. 1.

This management unit 14 constructs (newly constructs, or changes or the like) the routing table 19 according to controls by the CPU 18 in response to a request from the PSP 17, and supplies routing information of which the IP cache table 13a is short in response to a request from the processing unit 13. It should be noted that the CPU 18 also provides controls for deleting routing information deleted or changed according to updating of the routing table 19 from the IP cache table 13a. The CPU 18 also realizes a function of the routing protocol control section 7 shown in FIG. 2.

Figure 8:
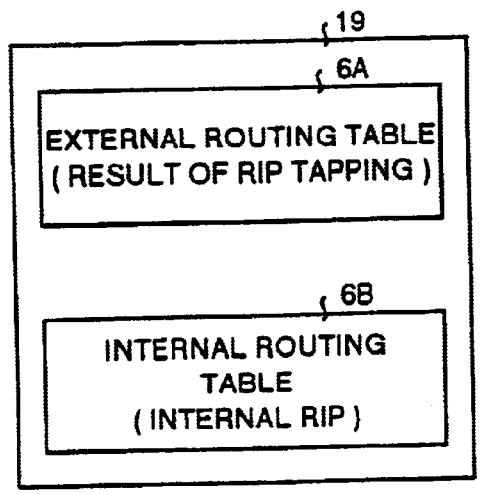
FIG. 8 is a view showing one example of a memory structure in the routing table according to one embodiment.

Description is made here in for the routing table 19. FIG. 8 is a view showing one example of a memory structure in the routing table 19. The routing table 19 corresponds to the second route storing section 6 shown in FIG. 1 and FIG. 2. Accordingly, this routing table 19 comprises, as shown in FIG. 8, an external routing table 6A constructed based on routing information copied for relaying, namely a result of RIP snooping, and an internal routing table 6B constructed based on routing information exchanged in a packet form between the transmission apparatus 1 according to this embodiment and any transmission apparatus having the function equivalent thereto, namely an internal RIP.

Figure 9:
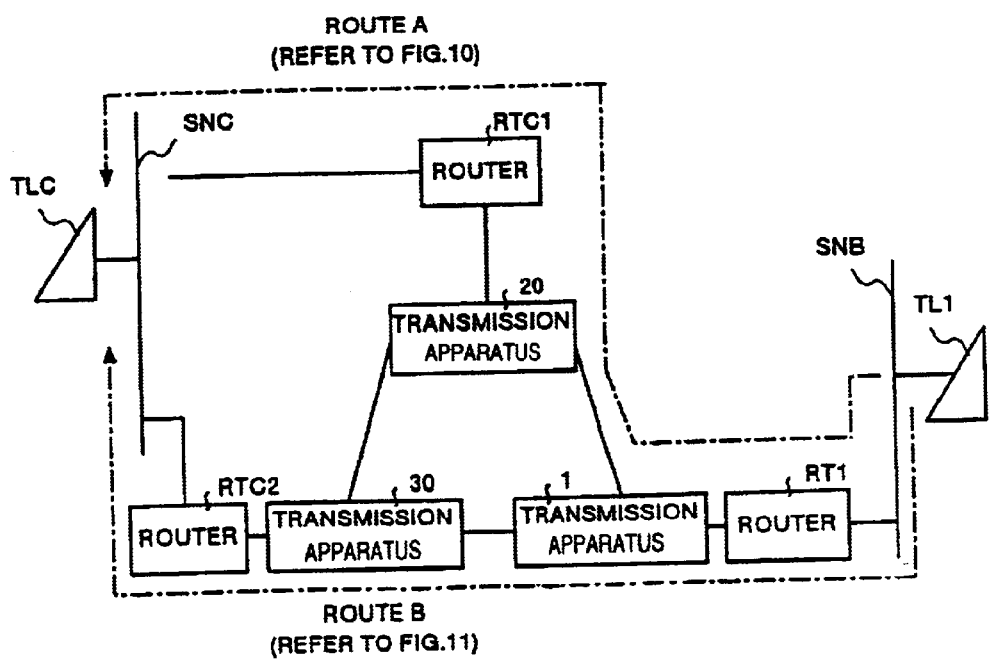
FIG. 9 is a block diagram showing one example of a network transmission system in which the transmission apparatus according to one embodiment is applied.
Figure 11:
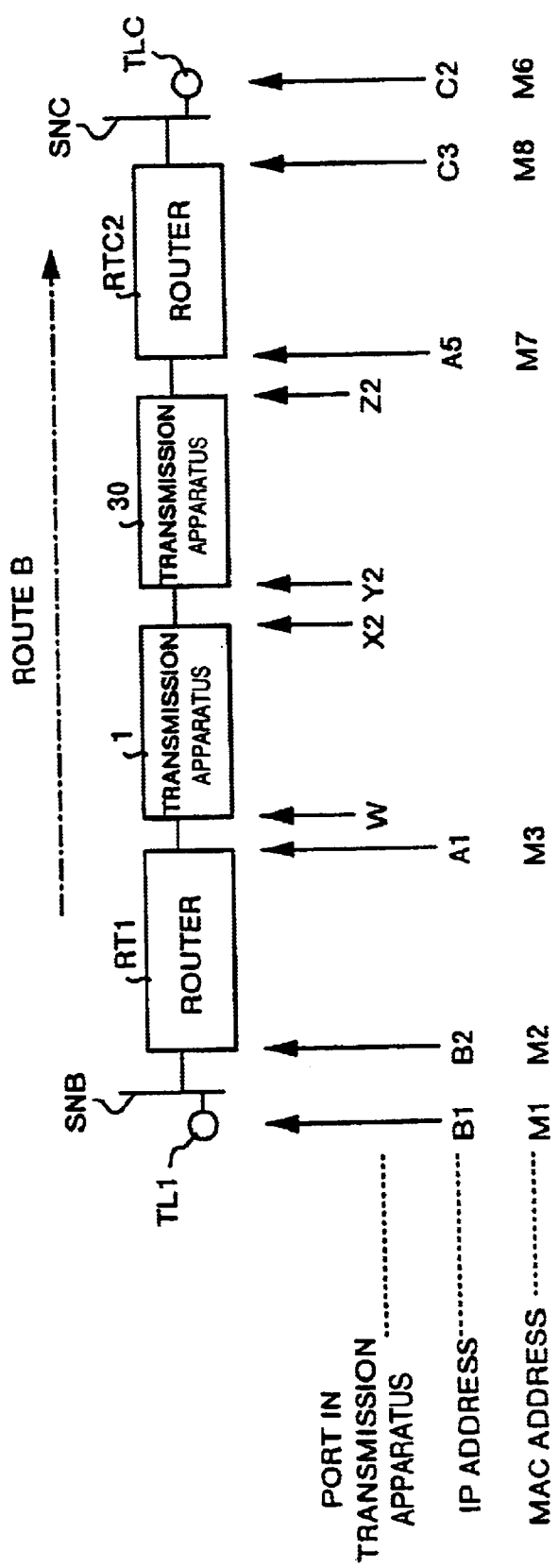
FIG. 11 is a view for conceptionally explaining an IP switching function in a second route in the network transmission system shown in FIG. 9.
Figures 12, 13A, 13B:
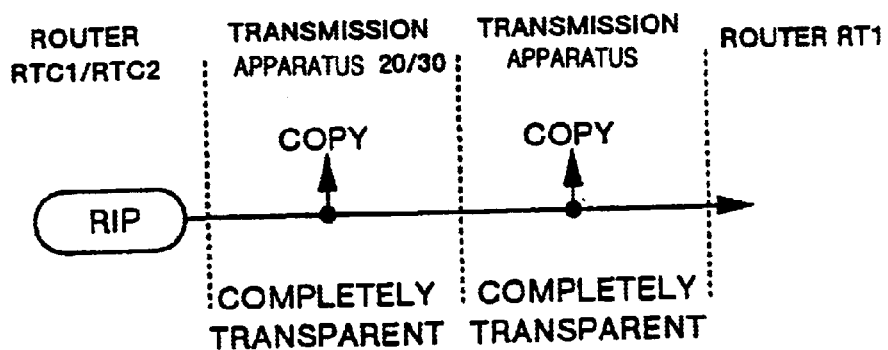
FIG. 12 is a view for explaining a flow of a RIP packet in the network transmission system shown in FIG. 9.
FIGS. 13A and 13B are views each showing one example of contents stored in an external routing table in a first routing in the network transmission system shown in FIG. 9.

Next, description is made for automatic construction of the external routing table 6A. This external routing table 6A is automatically constructed by snooping (firm function) of a RIP packet sent from a peripheral router. FIG. 9 is a block diagram showing one example of a network transmission system in which the transmission apparatus shown in FIG. 1 and transmission apparatus equivalent thereto are applied, FIG. 10 and FIG. 11 are views each for conceptionally explaining an IP switching function in a different route in the network transmission system, FIG. 12 is a view for explaining a flow of a RIP packet in the network transmission system, and FIG. 13 is a view showing one example of contents stored in the external routing table 6A in the network transmission system.

Figure 34:
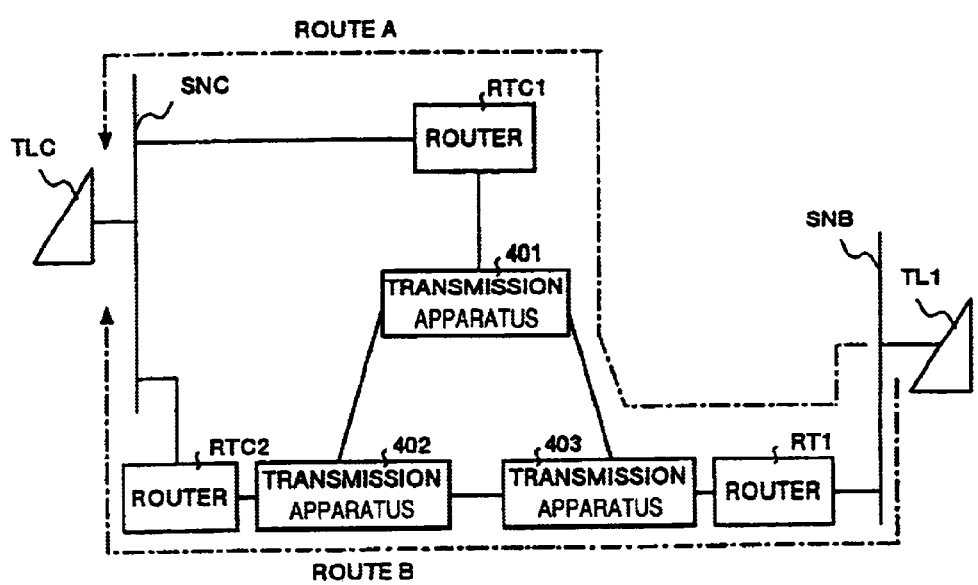
FIG. 34 is a block diagram schematically showing one example of a network transmission system with a plurality of routes formed between a source terminal and a destination terminal therein.

FIG. 9 shows arrangement of transmission apparatus 20, 30, and 1 according to this embodiment in place of the transmission apparatus 401, 402, and 403 in the network transmission system shown in FIG. 34. The transmission apparatus 20 and 30 have the same configuration and also the same function as those of the transmission apparatus 1 respectively. As for the relation among the apparatuses, each of the transmission apparatus 1, 20, and 30 which can be completely transparent to a frame is connected to the other two transmission apparatus respectively. The transmission apparatus 20 is connected to the subnet SNC via the router RTC1, and the transmission apparatus 30 is connected to the subnet SNC via the router RTC2. Connected to the subnet SNC is, for example, a terminal TLC, which transmits a frame to both of routes A and B when communications occur. Also, the transmission apparatus 1 is connected to the subnet SNB via the router RT1. Connected to the subnet SNB is, for example, a terminal TL1.

When a frame is transmitted from the terminal TL1 of the subnet SNB to the terminal TLC of the subnet SNC in the network transmission system shown in FIG. 9, there are two types of route such as a route A and a route B. In the route A, a frame sent out from the terminal TL1 arrives the terminal TLC through the router RT1, transmission apparatus 1, transmission apparatus 20, and router RTC1. In the route B, on the other hand, a frame sent out from the terminal TL1 arrives the terminal TLC through the router RT1, transmission apparatus 1, transmission apparatus 30, and router RTC2. In this case, the transmission apparatus determines any one of the routes A and B constituting a multipath each at the same cost as a regular route, and decision of the route is made thereby. In a case of the reverse direction (from the terminal TLC to TL1), transmission is made according to the route (any one of the route A or route B) having previously been set in the terminal TLC.

Figure 10:
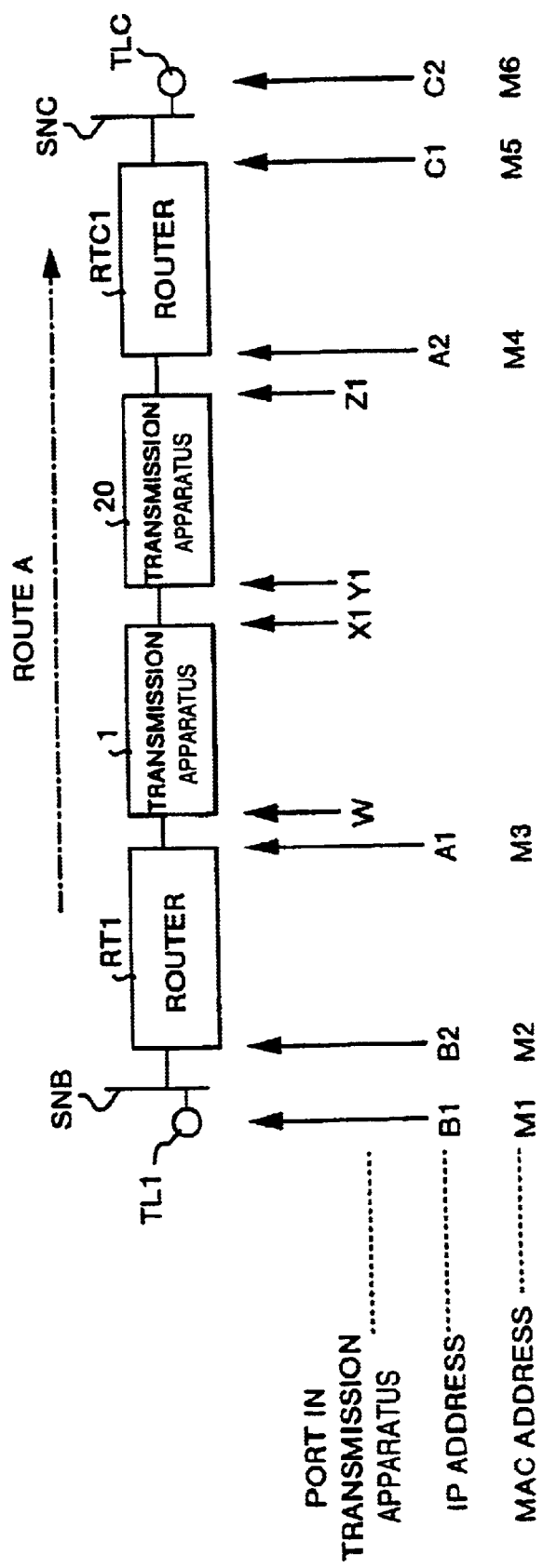
FIG. 10 is a view for conceptionally explaining an IP switching function in a first route in the network transmission system shown in FIG. 9.

FIG. 10 shows a relation, concerning to the route A in the network transmission system, among ports, IP addresses, and MAC addresses in the transmission apparatus. Allocated to the port in the side of the router RT1 in the transmission apparatus 1 is "W", and "X1" is allocated to the port in the side of the transmission apparatus 20 therein respectively. Allocated to the port in the side of the router RTC1 in the transmission apparatus 20 is "Z1", and "Y1" is allocated to the port in the side of the transmission apparatus 1 therein respectively. As for IP addresses of the apparatuses in the direction of transmission from the terminal TL1 to TLC, "B1" is allocated to the terminal TL1, "B2" and "A1" to the router RT1, "A2" and "C1" to the router RTC1, and "C2" to the router TLC respectively. Further, as for MAC addresses of the apparatuses in the direction of transmission also from the terminal TL1 to TLC, "M1" is allocated to the terminal TL1, "M2" and "M3" to the router RT1, "M4" and "M5" to the router RTC1, and "M6" to the router TLC respectively.

In the route A, when a RIP is transmitted from the router RTC1 in the side of the subnet SNC to the router RT1 in the side of the subnet SNB, as shown in FIG. 12, a RIP packet sent from the router RTC1 is copied and stored in the transmission apparatus 20 and 1 by being subjected to snooping while passing through the transmission apparatus 20 and then the transmission apparatus 1 which are completely transparent to the packet. Conversely, when a RIP is transmitted from the router RT1 in the side of the subnet SNB to the router RTC1 in the side of the subnet SNC, the RIP is also completely transparent in the transmission apparatus 1 and 20 in which snooping of the RIP is executed.

Also, FIG. 11 shows a relation, concerning to the route B in the network transmission system, among ports, IP addresses, and MAC addresses in the transmission apparatus. Allocated to the port in the side of the router RT1 in the transmission apparatus 1 is "W", and "X2" is allocated to the port in the side of the transmission apparatus 30 therein respectively. Allocated to the port in the side of the router RTC2 in the transmission apparatus 30 is "Z2", and "Y2" is allocated to the port in the side of the transmission apparatus 1 therein respectively. As for IP addresses of the apparatuses in the direction of transmission from the terminal TL1 to TLC at a different point from that in FIG. 10, "A5" and "C3" are allocated to the router RTC2 respectively. Further, as for MAC addresses of the apparatuses in the direction of transmission from the terminal TL1 to TLC also at a different point from that in FIG. 10, "M7" and "M8" are allocated to the router RTC2 respectively.

In the route B, when a RIP is transmitted from the router RTC2 in the side of the subnet SNC to the router RT1 in the side of the subnet SNB, as shown in FIG. 12, a RIP packet sent from the router RTC2 is copied and stored in the transmission apparatus 30 and 1 by being subjected to snooping while passing through the transmission apparatus 30 and then the transmission apparatus 1 which are completely transparent to the packet. Conversely, when a RIP is transmitted from the router RT1 in the side of the subnet SNB to the router RTC2 in the side of the subnet SNC, the RIP is also completely transparent in the transmission apparatus 1 and 30 in which snooping of the RIP is executed.

Description is made for an example of construction for the route A when copying is executed into the routing table 19 by snooping of the RIP. Stored in the external routing table 6A of the transmission apparatus 1 are IP addresses of peripheral routers closest to the transmission apparatus 1 in the side of the subnet SNB as well as in the side of the subnet SNC thereof. Namely, as shown in FIG. 13A, the IP address "A1" of the router RT1 is stored therein for the side of the subnet SNB, and the IP address "A2" of the router RTC1 is stored therein for the side of the subnet SNC.

Stored also in the external routing table 6A of the transmission apparatus 20 are IP addresses of peripheral routers closest to the transmission apparatus 20 in the side of the subnet SNB as well as in the side of the subnet SNC thereof. Namely, as shown in FIG. 13B, the IP address "A1" of the router RT1 is stored therein for the side of the subnet SNB, and the IP address "A2" of the router RTC1 is stored therein for the side of the subnet SNC.

The construction for the route B is also the same as described above. Stored in the external routing table 6A of the transmission apparatus 1 are IP addresses of peripheral routers closest to the transmission apparatus 1 in the side of the subnet SNB as well as in the side of the subnet SNC thereof. Namely, as shown in FIG. 14A, the IP address "A1" of the router RT1 is stored therein for the side of the subnet SNB, and the IP address "A5" of the router RTC2 is stored therein for the side of the subnet SNC.

Stored also in the external routing table 6A of the transmission apparatus 30 are IP addresses of peripheral routers closest to the transmission apparatus 30 in the side of the subnet SNB as well as in the side of the subnet SNC thereof. Namely, as shown in FIG. 14B, the IP address "A1" of the router RT1 is stored therein for the side of the subnet SNB, and the IP address "A5" of the router RTC2 is stored therein for the side of the subnet SNC.

As described above, each of peripheral routers can declare with the RIP packet through how many hops from the router (peripheral router) the router can reach any of all destination IP subnets (such as the subnets SNB and SNC) on the network.

Also, each of the transmission apparatus 1, 20 and 30 holds a copy by snooping while relaying the RIP packet, and can determine by checking the copy as to which is the closest peripheral router among all the destination IP subnets on the network. By reflecting a result of the determination to the external routing table 6A, the routing table can automatically be constructed.

Now, consideration is made for a case where a plurality of routes each at the same cost are detected concerning a frame of a routing protocol sent from one of peripheral routers. This case corresponds to a case where a plurality of routes (e.g., two routes) exist so that the closest peripheral router is either A5 or A2 assuming that the destination IP subnet in FIG. 13A and FIG. 14A is C.

In the case described above, only routing information, in a RIP packet arrived later from one of peripheral routers, at the same cost but different from that in the previous one is deleted, and the notice is sent to the peripheral routers. With this operation, only one route information can be seen in the peripheral routers, so that it is possible to avoid inconsistencies in the tables between a transmission apparatus and the peripheral routers. Then, description is made for operations concerning a multipath at the same cost with reference to the network transmission system shown in FIG. 9 as well as to figures in FIG. 15 to FIG. 19.

Figure 15:
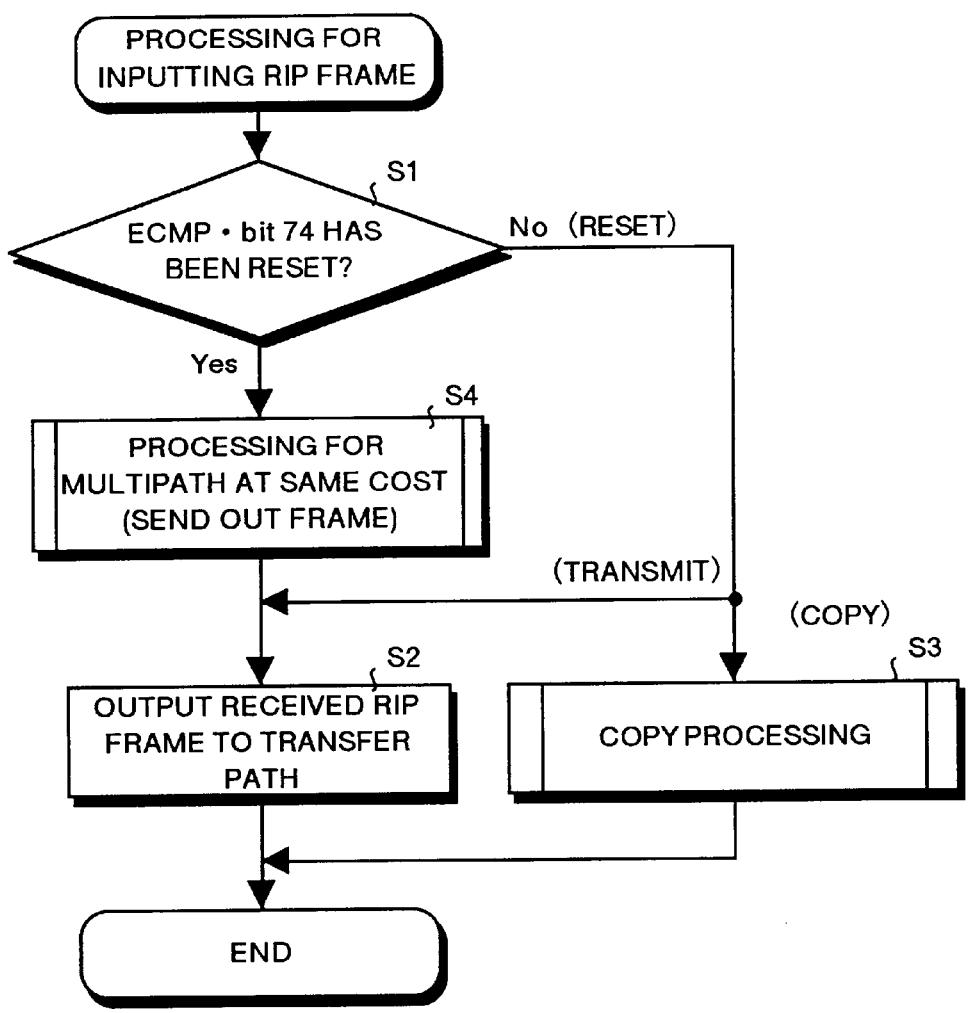
FIG. 15 is a flow chart for explaining processing of inputting a RIP frame according to the embodiment.
Figure 16:
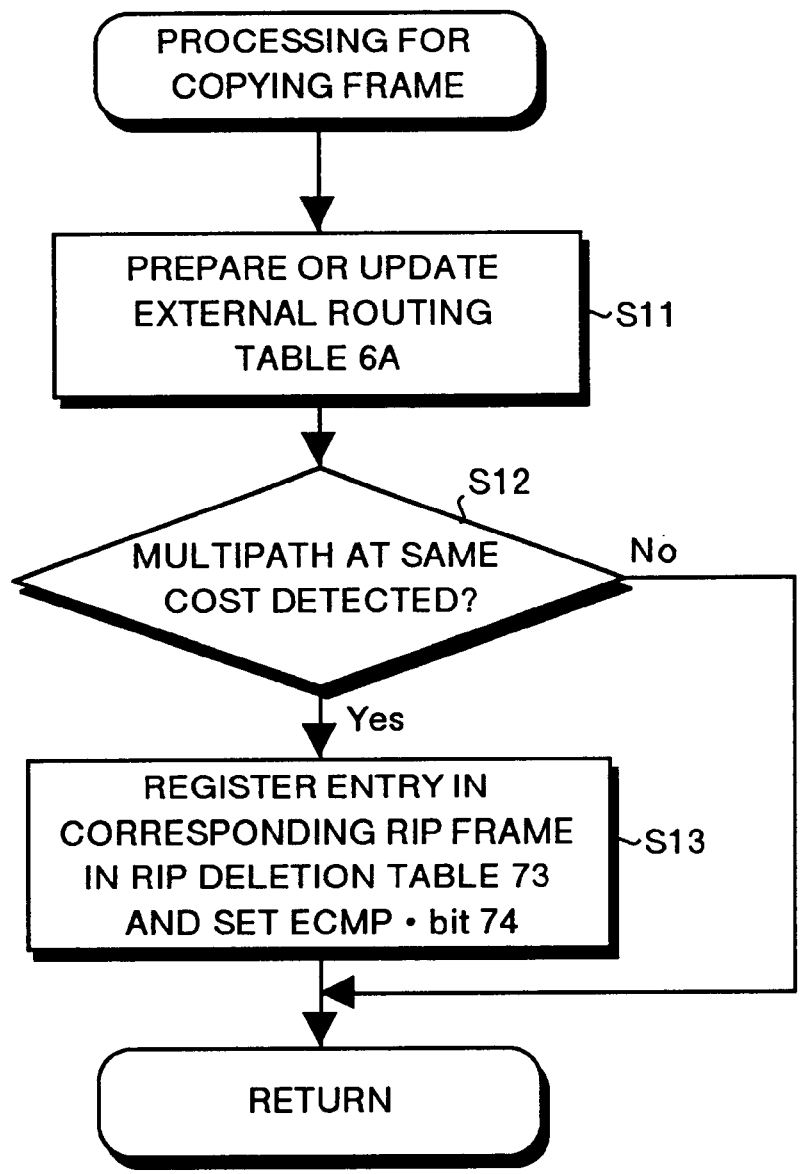
FIG. 16 is a flow chart for explaining frame copy processing in the processing of inputting a RIP frame shown in FIG. 15.
Figure 17:
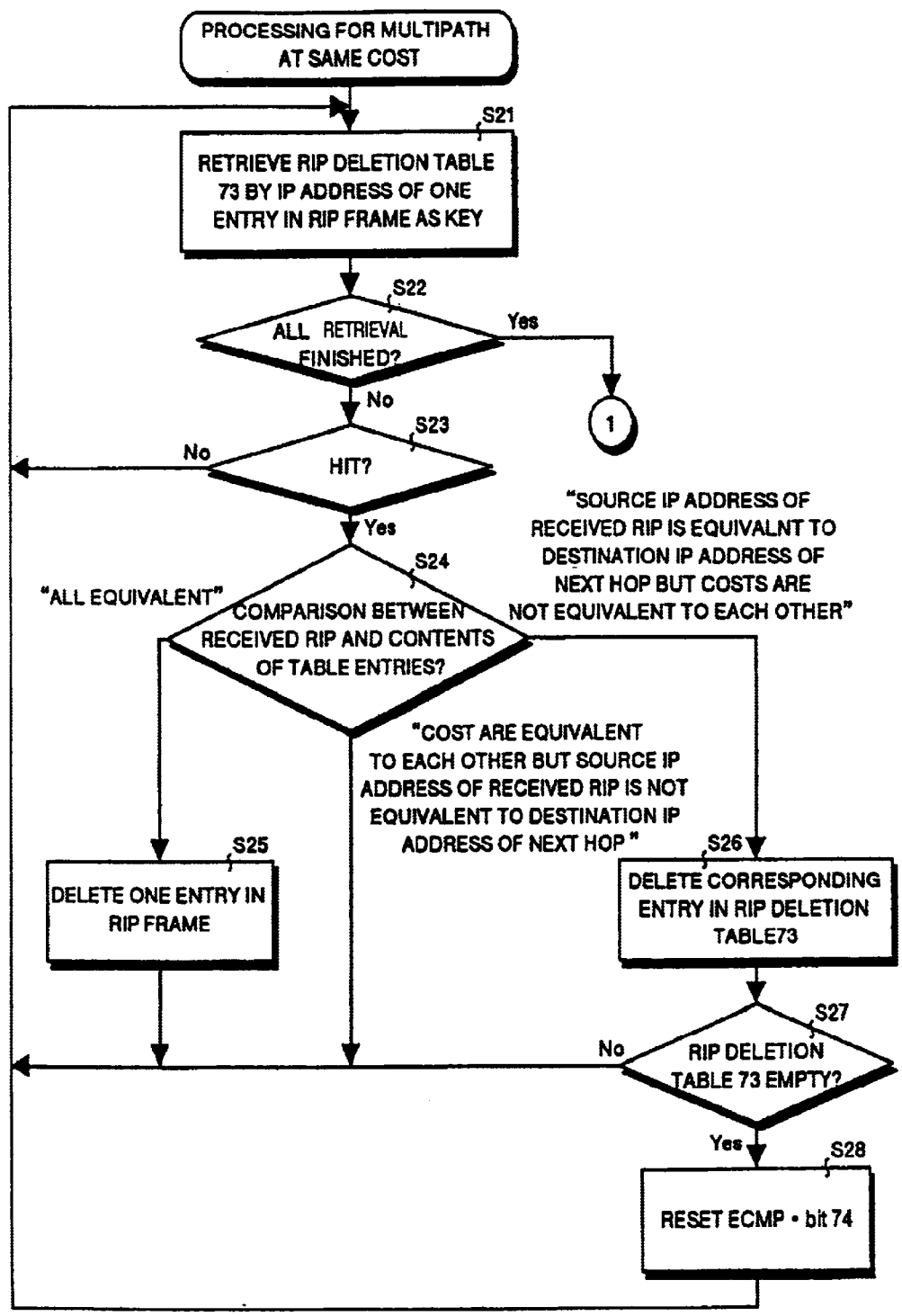
FIG. 17 is a flow chart for explaining processing for a multipath at the same cost in the processing of inputting a RIP frame shown in FIG. 15.
Figures 18, 19:
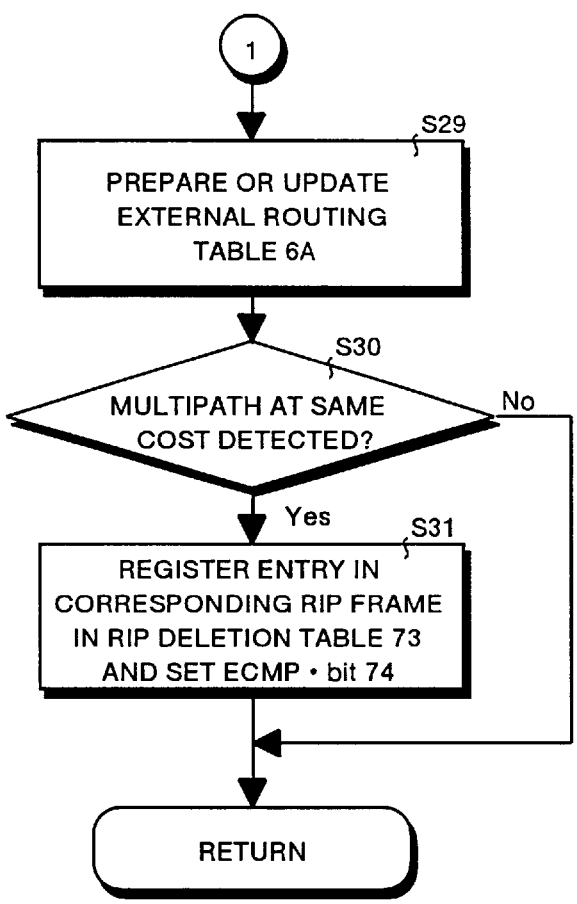
FIG. 18 is a flow chart for explaining processing for a multipath at the same cost in the processing of inputting a RIP frame shown in FIG. 15.
FIG. 19 is a view showing an example of using the RIP deletion table according to this embodiment.

FIG. 15 is a flow chart for explaining the processing of inputting a RIP frame according to this embodiment, FIG. 16 is a flow chart for explaining frame copy processing in the processing of inputting a RIP frame shown in FIG. 15, FIG. 17 is a flow chart for explaining the multipath processing at the same cost in the processing of inputting a RIP frame shown in FIG. 15, FIG. 18 is a flow chart for explaining the multipath processing at the same cost in the processing of inputting a RIP frame shown in FIG. 15, and FIG. 19 is a view showing an example of using the RIP deletion table according to this embodiment. It should be noted that operations described later are effected by the CPU 18 of the management unit 14, namely by the function of the routing protocol control section 7, and so the operations are described by using names of the functional blocks in FIG. 2. Also, it is assumed that this problem on the multipath at the same cost does not occur on the OSPF.

When a RIP frame is identified by the protocol identifying section 3, the RIP frame is transmitted to the routing protocol control section 7. In the routing protocol control section 7, the RIP frame is accepted by a RIP frame receiving section 71, and controls for the routing protocol is executed by a RIP deletion table control section 72 according to the RIP frame.

At first, determination is made by the RIP deletion table control section 72 as to whether ECMP·bit 74 is set or reset (step S1). If it is determined that the ECMP·bit 74 has been reset as a result, which indicates that no multipath at the same cost is detected, so that the processing shifts to step S2, and the received RIP frame is transmitted by output processing to a transfer path selected by the route selecting section 4 because the received RIP frame is completely transmitted through any router. In the case of reset as described above, the processing shifts also to step S3, in which the frame copy processing is executed (Refer to FIG. 16).

On the other hand, if it is determined that the ECMP·bit 74 has been set, which indicates that a multipath at the same cost is detected, so that the processing shifts to step S4, and the processing for the multipath at the same cost is executed (Refer to FIG. 17 and FIG. 18). As described above, the case where the ECMP·bit 74 is set indicates existence of information (table entry) for at least one routing concerning a multipath at the same cost in the RIP deletion table 73.

At first, detailed description is made for the frame copy processing in step S3 with reference to FIG. 16. In the frame copy processing, at first, an external routing table 6A is newly prepared or updated by the external routing control section 75 step S11). The processing concerning this external routing table 6A has been described in the flow of the RIP frame for the route A (FIG. 13) and the route B (FIG. 14), so that description thereof is omitted herein.

When new preparation or updating of the external routing table 6A as described above makes any other route to occur so as to form a multipath at the same cost (step S12), an entry in a RIP frame corresponding to the multipath at the same cost is stored in the RIP deletion table 73 by the external routing control section 75, and the ECMP·bit 74 is set so as to indicate detection of a multipath at the same cost (step S13). Then, the processing returns to FIG. 15 and is ended.

As for the storage of the entry to the RIP deletion table 73 in step S13, when the network transmission system employs a route having a smaller source IP address in the RIP frame and does not employ a route having a larger source IP address, the route A is employed, so that the route B is not employed. That is because, in the transmission apparatus 1, the IP address of the router RTC1 is A2 and the IP address of the router RTC2 is A5. Accordingly, as the RIP deletion table 73 shown in FIG. 19, the destination IP subnet "C", the destination IP address as the next hop "A5" and the cost "1" are correlated to each other as one of table entries and are stored therein. The cost "1" indicates here that there exists only one unit of peripheral router which is the router RTC2 on the way from the transmission apparatus 1 to the subnet SNC as a partner.

As described above, even if a multipath at the same cost is not detected at the stage when a RIP frame is received, if a multipath at the same cost is detected from the external routing table 6A at the stage when the multipath is stored in the external routing table 6A according to the RIP frame, the ECMP·bit 74 is set at that stage. Existence of a table entry in the RIP deletion frame 73 is shown in response to a multipath at the same cost according to this ECMP·bit 74 from the stage when the next RIP frame is received.

Namely, when there exist the routes A and B like the network transmission system shown in FIG. 9, existence of the multipath at the same cost can not be confirmed so far as both of the route A and the route B are used for relaying once in the transmission apparatus 1. Accordingly, concerning a multipath at the same cost, even if information is routing information to be stored in the RIP deletion table 73 later, a first relaying should be executed.

Next detailed description is made for the processing for a multipath at the same cost in step S4 with reference to FIG. 17 and FIG. 18. In this processing, at first, the RIP deletion table 73 is searched by an IP address of one entry in the RIP frame as a key (FIG. 17: step S21). It should be noted that one entry is formed with four fields in the RIP frame like the format (Entry 1, Entry 2, Entry 3 . . . ) in FIG. 3 described above, and the number of the stored four-field packets is the number of entries.

Then, while retrieval for all the entries is not finished (step S22), determination is made for each entry as to whether a hit is found in the RIP deletion table 73 or not (step S23). If it is determined in step S23 that a hit is not found, the processing returns again to step S21, and the next entry is also retrieved in the RIP deletion table 73.

If it is determined in step S23 that a hit is found, comparison is made between contents of the received RIP frame and any contents of the hit table entries (RIP deletion table 73) (step S24). As a result, if it is determined in the comparison that all the contents are equivalent to each other, namely when both the destination IP address and the cost of the next hop are equivalent to the destination IP subnet, the corresponding entry for the route is deleted from the RIP frame in this transmission apparatus 1 (step S25). Then, the processing returns to step S21, in which retrieval for the next entry is executed to the RIP deletion table 73.

For example, when any entry in which a source IP address in the RIP frame is A5, a destination IP address is C and cost is "1" is included therein, as shown in FIG. 19, there is the table entry coincident with the contents of the entry, and for this reason, the entry is deleted from the RIP frame.

When costs are equivalent to each other but a source IP address of the RIP is not equivalent to a destination IP address of the next hop in the table, a route for the entry in the RIP frame at least corresponds to the route (route A) selected among the multipath at the same cost, then, the processing returns to step S21.

In step S24, when a source IP address of the RIP is equivalent to a destination IP address of the next hop but costs are not equivalent to each other, any change occurs in the number of installed peripheral routers for the corresponding route (a state of a multipath at the same cost), so that the older table entry currently stored in the RIP deletion table 73 is invalid in the system and deleted (step S26). In this case, conformation is made in the next step S27 as to whether the RIP deletion table 73 is empty due to the deletion of the table entry or not.

Then, when the RIP deletion table 73 is empty, the ECMP·bit 74 is reset (step S28), and the processing returns to step S21. Also, when one or more of other table entries exist after the deletion of the RIP deletion table 73, the processing returns to step S21 while the ECMP·bit 74 is kept to be set.

It should be noted that, when a destination IP address of an input RIP is not equivalent to a destination IP address of the next hop and also the required costs are not identical, although this case is not shown in the figure, the processing returns to step S21.

As described above, when retrieval of all the entries in the received RIP frame to the RIP deletion table 73 is finished (step S22), the processing shifts to step S29 (FIG. 18). In step S29, new preparation or updating of an external routing table 6A is performed by the external routing control section 75. Then, when some other new route so as to be a multipath at the same cost occurs due to new preparation or updating of the external routing table 6A (step S30), an entry in the RIP frame correlating to the multipath at the same cost is stored in the RIP deletion table 73 and the ECMP·bit 74 is set so as to indicate detection of the multipath at the same cost by the external routing control section 75 (step S1).

Then, the received RIP frame is outputted to a transfer path selected by the route selecting section 4 (step S2) In step S2, the received RIP frame is notified to peripheral routers in a state where all the entries stored in the RIP deletion table 73 have been deleted, so that the peripheral routes can see only one route of A in the network transmission system shown in FIG. 9. For this reason, it is possible to avoid inconsistencies in the tables between the transmission apparatus 1 as a backbone switch and peripheral routers. After the operation, the processing returns to FIG. 15 and is ended.

Figure 20:
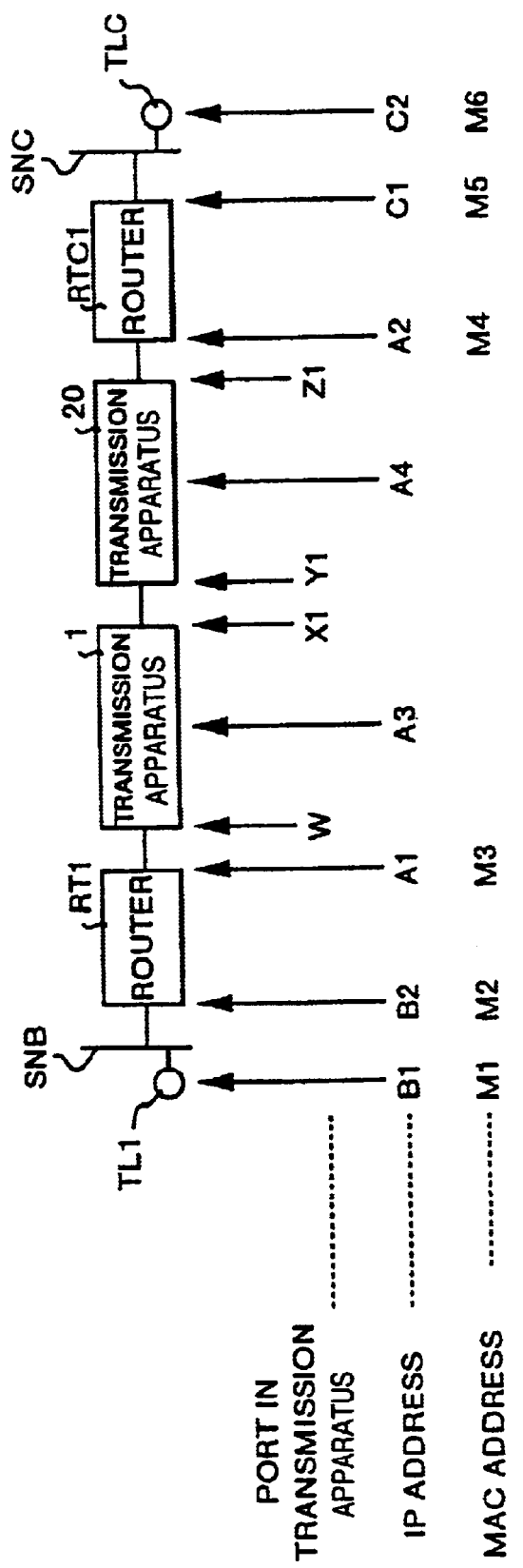
FIG. 20 is a view for conceptionally explaining a function of exchanging internal RIP packets in the network transmission system according to one embodiment.
Figures 21, 22A, 22B:
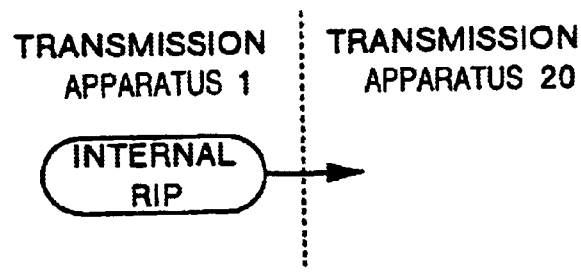
FIG. 21 is a view for explaining a flow of the internal RIP packet in the network transmission system according to one embodiment.
FIGS. 22A and 22B are views each showing one example of contents stored in an internal routing table in the network transmission system according to one embodiment.

Next description is made for automatic construction of an internal routing table 6B of the transmission apparatus 1 for deciding a route to be abandoned for a multipath at the same cost. This internal routing table 6B in the network transmission system shown in FIG. 9 is automatically constructed by exchanging an internal RIP packet (firm function) between the transmission apparatus 1 and the transmission apparatus 20 having a function equivalent thereto. FIG. 20 is a view for conceptionally explaining a function of exchanging internal RIP packets in the network transmission system, FIG. 21 is a view for explaining a flow of the internal RIP packet in the network transmission system, and FIG. 22 is a view showing one example of contents stored in the internal routing table 6B in the network transmission system.

As for the automatic construction of the internal routing table 6B, as shown in FIG. 20, IP addresses "A3" and "A4" are allocated to the transmission apparatus 1 and 20 respectively in the network transmission system shown in FIG. 12 described above. However, material substance of those IP addresses "A3" and "A4" can not be seen from the peripheral routers, so that the addresses are information for internal communications effected for only the transmission apparatus 1, 20 and transmission apparatus (e.g., transmission apparatus 30) each having the same configuration and functions as those in the apparatuses 1 and 20.

Figure 31:
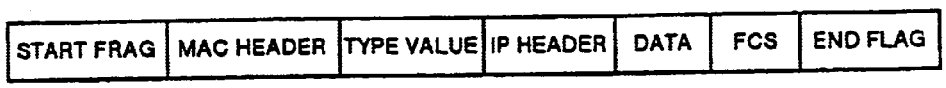
FIG. 31 is a view schematically showing a format of a frame used for the TCP/IP protocol.
Figure 32:
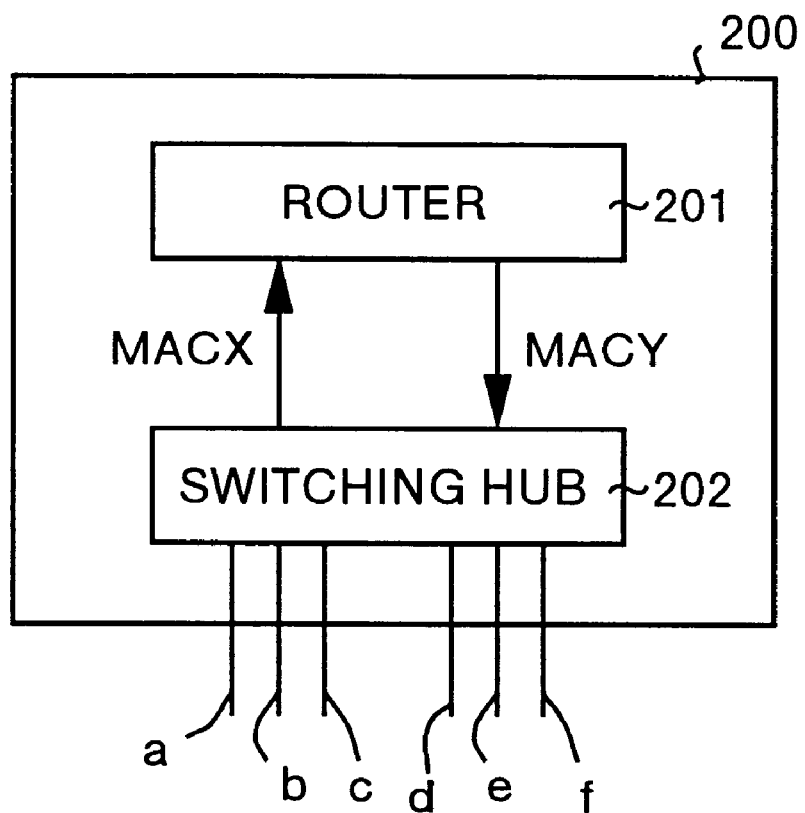
FIG. 32 is a block diagram schematically showing a transmission apparatus constructed by a combination of a switching hub with a router based on the conventional technology.
Figure 33:
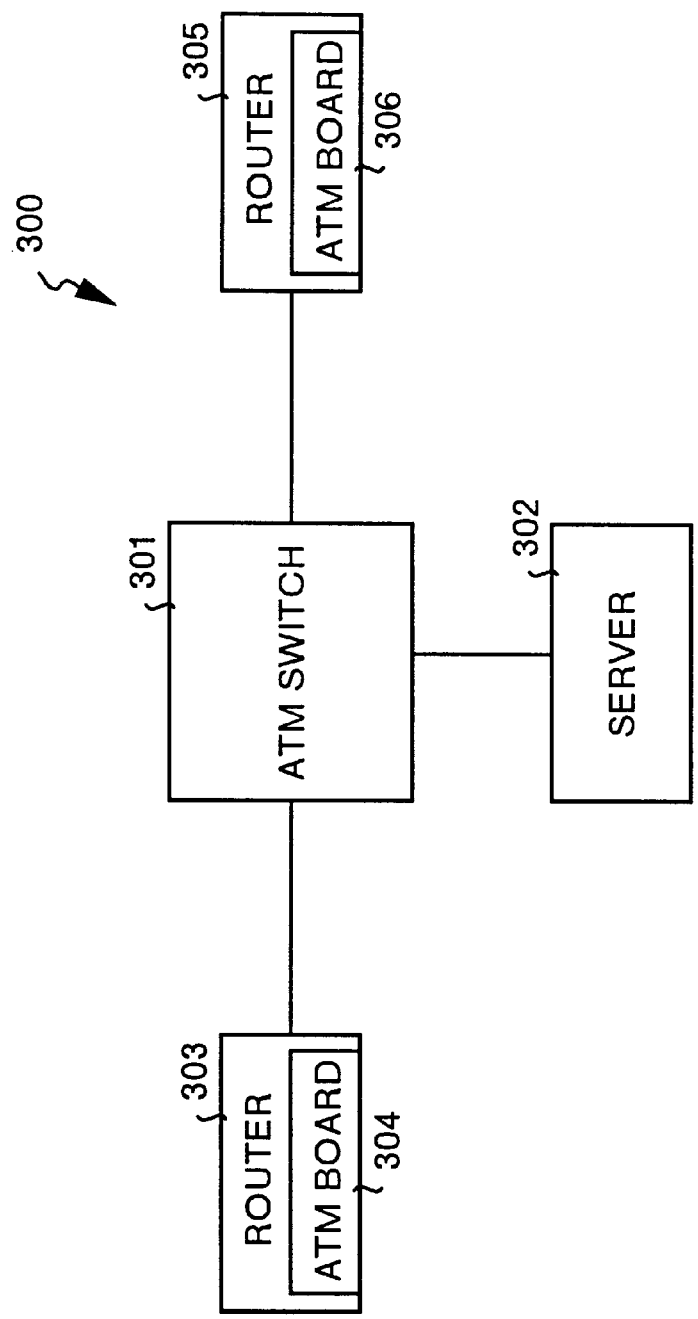
FIG. 33 is a block diagram schematically showing a transmission apparatus constructed by a combination of an ATM switch with a router based on the conventional technology.

An internal RIP packet sent, for example, from the transmission apparatus 1 to transmission apparatus 10 in the network transmission system shown in FIG. 20 is transacted only between transmission apparatus equivalent to each other. As for this internal RIP packet, if a type value in the frame format shown in FIG. 31 is defined so as to be different from that of an ordinary IP, the internal RIP packet is identified as an internal RIP by the PSP 17 when received by the transmission apparatus 1 and 20.

Description is made here for an example of construction when copying is executed from the internal RIP packet into a routing table in the transmission apparatus 1 and 20. Stored in the internal routing table 6B of the transmission apparatus 1 are numbers of frame transmission ports each as a transfer path to the peripheral routers closest to the transmission apparatus 1 in the side of the subnet B as well as in the side of the subnet C thereof. Namely, as shown in FIG. 22A, a number "W" of the frame transmission port is stored therein for the IP address A1 of the peripheral router RT1, and a number "X1" of the frame transmission port is stored therein for the IP address "A2" of the router RTC.

Stored also in the internal routing table 6B of the transmission apparatus 20 are numbers of frame transmission ports each as a transfer path to the peripheral routers closest to the transmission apparatus 20 in the side of the subnet SNB as well as in the side of the subnet SNC thereof. Namely, as shown in FIG. 22B, a number "Y1" of the frame transmission port is stored therein for the IP address A1 of the peripheral router RT1, and a number "Z1" of the frame transmission port is stored therein for the IP address A2 of the router RTC.

As described above, each of the transmission apparatus 1, 20 and transmission apparatus equivalent thereto can declare by the internal RIP packet through how many hops from the apparatus (transmission apparatus) the apparatus can reach any of all the peripheral routers RT1, RTC1, and RTC2 on the network.

Also, each of the transmission apparatus 1 and 20 can determine which is the shortest route among all the peripheral routers on the network by receiving the internal RIP packet when relayed. By reflecting the result to the internal routing table 6B, the routing table can automatically be constructed.

Figure 23:
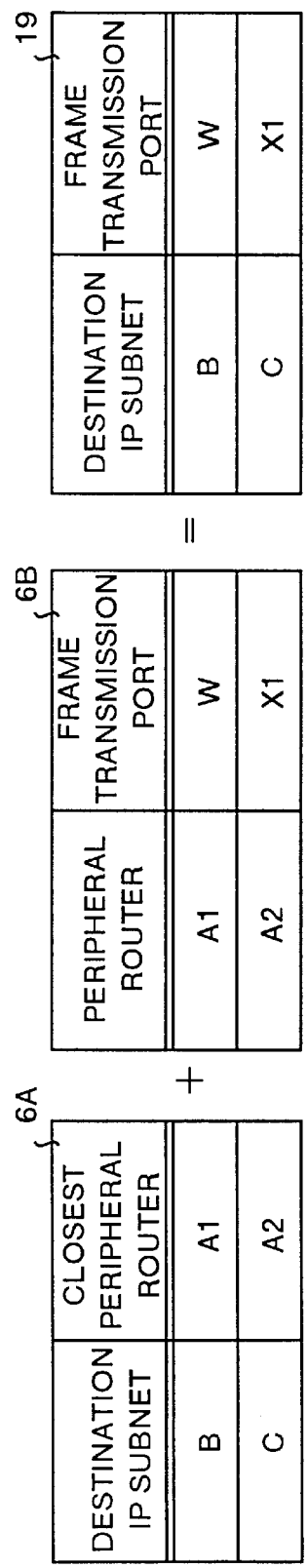
FIG. 23 is a view for conceptionally explaining a method of constructing a routing table according to one embodiment.

Next description is made for a method of constructing the routing table 19. FIG. 23 is a view for conceptionally explaining a method of constructing the routing table 19 according to this embodiment. The routing table 19 is constructed by the external routing table 6A and the internal routing table 6B each automatically constructed as described above.

When description assumes here the transmission apparatus 1 as an example (the transmission apparatus 20 is the same as the transmission apparatus 1, so that description thereof is omitted herein), the routing table 19 is obtained, as shown in FIG. 23, by correlating the external routing table 6A (Refer to FIG. 13A) to the internal routing table 6B (Refer to FIG. 22A) with IP addresses of peripheral routers. As a method of using this table, for example, there is a case where a frame is transmitted from the transmission apparatus 1 to the side of the subnet SNB, in which, when detection can not be made in the IP cache table 13a, at first route information is retrieved in the external routing table 6A, and as a result, "A1" is obtained as the IP address of the closest peripheral router in the side of the subnet SNB.

When the route information can be obtained by searching the external routing table 6A as described above, then route information in the internal routing table 6B is retrieved. As a result, a number "W" of a frame transmission port can be acquired this time from this IP address "A1". As described above, the number "W" of a frame transmission port can resultantly be acquired to the destination IP subnet B (subnet SNB) as shown in FIG. 23.

Figure 24:
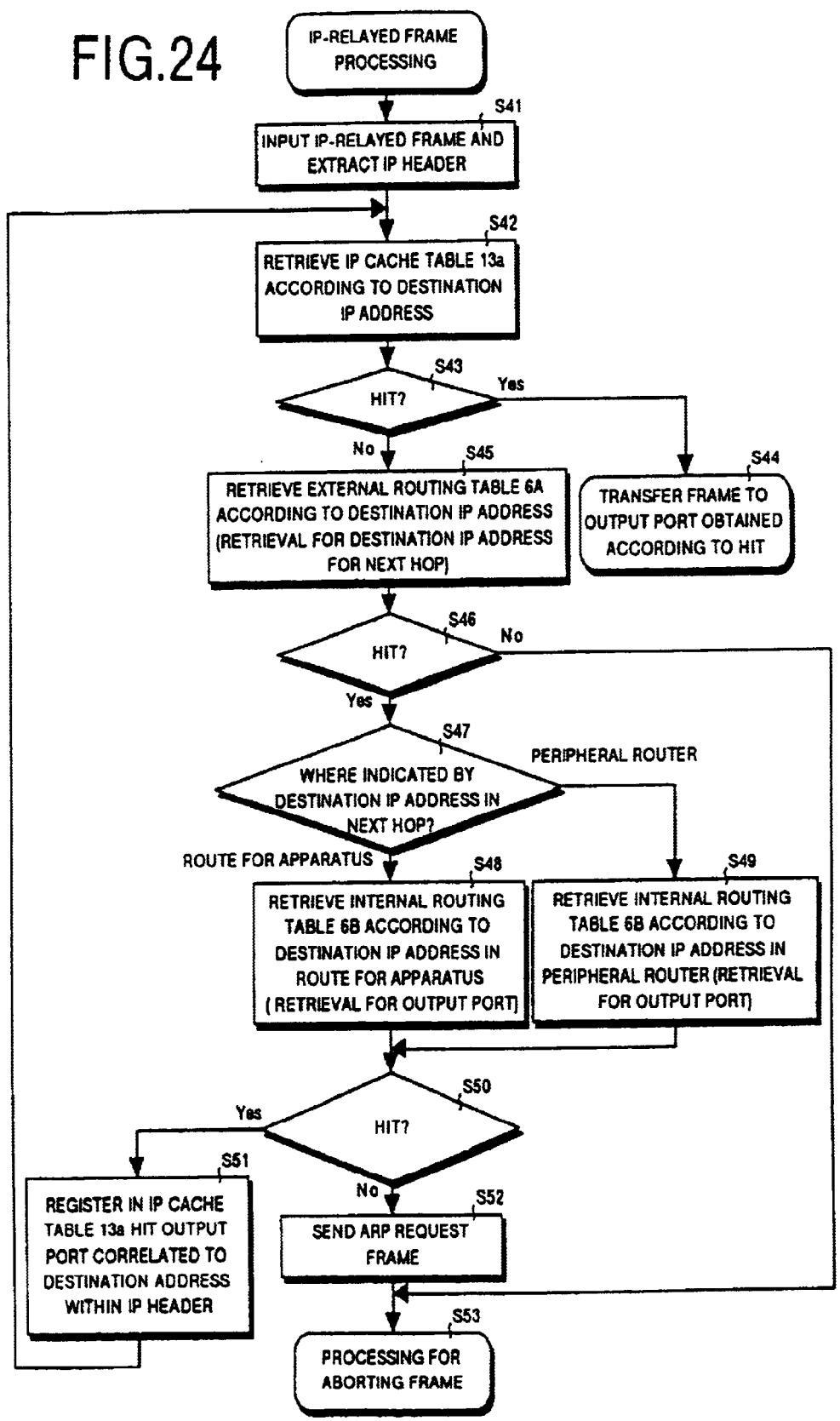
FIG. 24 is a flow chart for explaining frame processing for an IP relay according to this embodiment.

Next description is made for operations executed along hardware configuration of the transmission apparatus 1 in FIG. 7. FIG. 24 is a flow chart for explaining a processing for an IP relay frame according to this embodiment.

When the processing for an IP relay frame is started and the frame (IP relay frame) is received by the transmission apparatus 1, at first an IP header is extracted from the received frame by the PSP 17 (step S41). Then, a destination IP address is taken out from the extracted IP header, and the IP cache table 13a in the processing unit 13 is searched by the destination IP address as a key (step S42). As a result of the retrieval, if a hit is found in a particular route information (output port) (step S43), the received frame is transferred as it is to the output port obtained by the hit without being rewritten (step S44).

On the other hand, if a hit is not found in the particular route information (output port) as a result of the retrieval, the external routing table 6A in the routing table 19 is searched, with a support from the management unit 14 this time, by the destination IP address as a key (step S45). This operation is a retrieval for a destination IP address of the next hop. Concretely, as shown in FIG. 23, destination information for correlating the external routing table 6A to the internal routing table 6B, namely an IP address of the closest peripheral router to the apparatus (including a route for the apparatus) is retrieved.

If a hit is not found in retrieval of the next hop (step S46), which indicates there is no retrieval key in the internal routing table 6B, the processing shifts to frame abort processing and is ended (step S53). On the other hand, if a hit is found in retrieval of the next hop (step S46), determination is made as to whether a destination IP address of the hit next hop indicates any apparatus provided in the route of the apparatus, namely directly connected to the apparatus, or indicates any of peripheral routers (step S47).

As a result, if it is determined that the route indicated by the destination IP address of the next hop is the route of the apparatus, the internal routing table 6B in the routing table 19 is searched this time by the destination IP address as a key (step S48). Concretely, as shown in FIG. 23, a frame transmission port (output port) corresponding to the destination IP address is retrieved in the internal routing table 6B.

If a hit is found in the output port as a result of retrieval in this internal routing table 6B (step S50), routing information with the output port obtained by the hit and the destination IP address defined in the IP header correlated thereto is stored in the IP cache table 13a (step S51). Then, the processing returns to step S42. It should be noted that, if a hit can not be found (step S10), an ARP request frame (a request for a MAC address) is transmitted to the network instep S52, and the frame abandonment processing is executed in the next step S53.

According to a case where the ARP request frame is received after the transmission of the ARP request frame in step S52, it is possible to study here whether peripheral apparatus such as terminals and routers is controlled as a host route to the transmission apparatus 1 or is put under the control by other transmission apparatus. The point how to construct the routing table 19 from this ARP frame is departed from the scope of the present invention, so description thereof in detail is omitted herein.

In step S47, if it is determined that the route indicated by the destination IP address of the next hop is the peripheral router, the internal routing table 6B is searched this time by the destination IP address of the next hop as a key (step S49). Concretely, as shown in FIG. 23, a frame transmission port (output port) corresponding to the IP address of the peripheral router (destination IP address of the next hop) is retrieved in the internal routing table 6B. The same processing as that in the route of the apparatus is executed thereafter and on.

Figure 25:
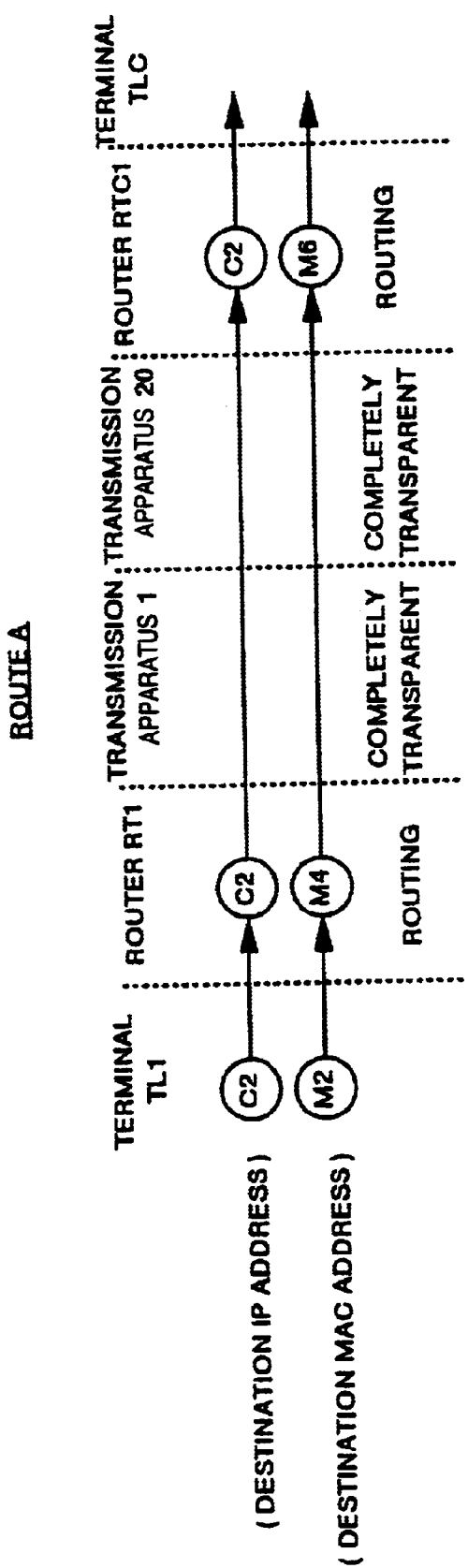
FIG. 25 is a view for explaining changes of a destination IP address as well as of a destination MAC address transmitted through the first route in the network transmission system shown in FIG. 9.
Figure 26:
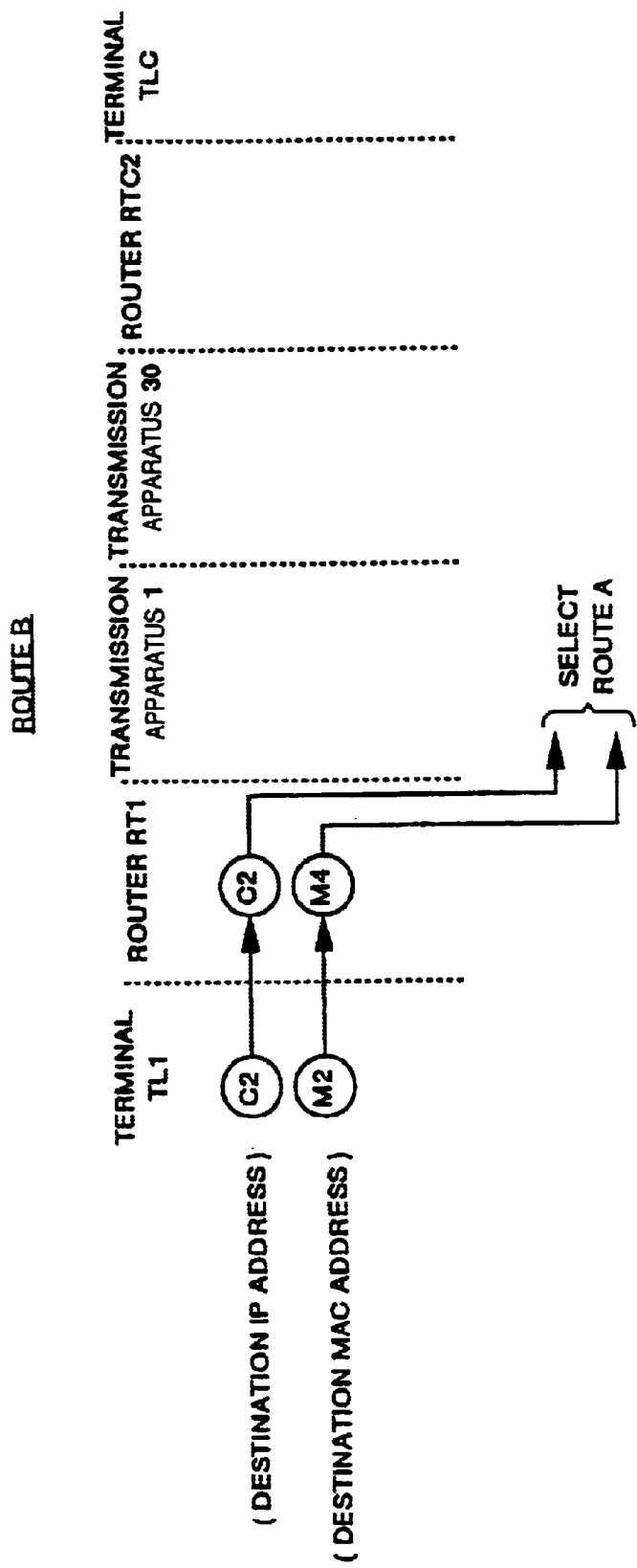
FIG. 26 is a view for explaining changes of a destination IP address as well as of a destination MAC address transmitted through the second route in the network transmission system shown in FIG. 9.

As a concrete example, description assumes here a case as an example where a frame is transmitted from the terminal TL1 connected to the LAN in the side of the subnet SNB to the terminal TLC connected to the LAN in the side of the subnet SNC in the network transmission system in FIG. 20. FIG. 25 and FIG. 26 are views for explaining changes of a destination IP address as well as of a destination MAC address transmitted through the route A and route B in the network transmission system, FIG. 27 is views each showing one example of contents stored in a routing table in the network transmission system, and FIGS. 28A and 28B are views each showing one example of contents stored in the IP cache table 13a in the network transmission system. FIGS. 29A and 29B are views showing one example of contents stored in the routing table of the router RT1 and also showing one example of contents stored in the routing table of the router RTC1 in the network transmission system respectively.

At first, concerning the route A, a frame relay from the terminal TL1 to the terminal TLC is effected by starting a routing operation, as shown in FIG. 25, with reference to the routing tables in FIG. 29A and FIG. 29B at the routers RT1 and RTC1 respectively. For this reason, the MAC address in the MAC header sent out from the terminal TL1 is rewritten from the MAC address "M2" to "M4" by passing through the router RT1, and is rewritten from the MAC address "M4" to "M6" by passing through the router RTC1.

As for the route B, as shown in FIG. 26, a frame relay from the terminal TL1 to the terminal TLC is effected by starting a routing operation with reference to the routing table in FIG. 29A at the router RT1. At this point of time, as route information for the route B is not notified from the transmission apparatus 1, the route A, namely the route passing through the transmission apparatus 1, 20 and the router RTC1 is always selected.

Namely, as the table entry concerning the route B is stored in the RIP deletion table 73 of the transmission apparatus 1 as described above, the entry corresponding to the destination IP network C is deleted at the point of time when a RIP frame from the router RTC2 arrives at the transmission apparatus 1. Accordingly, at the point of time when the RIP frame from the router RTC2 arrives at the router RT1, as information for the IP network C is not included in the route information, there is only the information (route A) from the router RTC1 as the information for the IP network C in the routing table of the router RT1.

Now, in a frame relay concerning the route A, relaying is transparently executed between the transmission apparatus 1 and 20, so that the MAC address is not rewritten and the frame transmitted from the router RT1 is received as it is by the router RTC1. However, the routing table 19 is searched by firmware unless the destination IP address "C2" is stored in the IP cache table 13a in either one or both of the transmission apparatus 1 and 20. The output port and the destination IP address obtained by the retrieval are stored in the IP cache table 13a as described in the flow chart.

Namely, the routing information in the routing table 19 shown in FIG. 27A is used in the transmission apparatus 1, and the routing table 19 shown in FIG. 27B is used in the transmission apparatus 20. It should be noted that the routing tables 19 and 19 shown in FIG. 27A and FIG. 27B are constructed by the external routing table 6A and internal routing table 6B in FIG. 13 and FIG. 22 respectively.

Then, in a case of the transmission apparatus 1 (Refer to FIG. 28A), the destination IP address "C2" and the frame transmission port "X1" are correlated to each other and stored in the IP cache table 13a, and in a case of the transmission apparatus 20 (Refer to FIG. 28B), the destination IP address "C2" and the frame transmission port "Z1" are correlated to each other and stored therein.

When the frame relay is carried out in the correlation shown in FIG. 28, as the routing information is already stored in the IP cache table 13a, fast switching can be effected only by selecting the route according to the cache (hardware) without taking the process of selecting the route according to the firmware.

As described above, with this embodiment, a plurality of routes are previously formed in the network transmission system, and when information concerning a plurality of routes constituting a multipath each at the same cost is constructed by a received routing protocol, information for a route to be relayed is constructed according to information for any one of the plurality of routes. With this feature, a unique route is given to the system even if there exists a plurality of routes constituting a multipath each at the same cost. As a result, it is possible to realize high-reliability communications by maintaining the compatibility with each routing even under the condition of forming a multipath at the same cost for realizing cost performance of the apparatus as a whole without being caught by the transmission method applied to the OSI layers based on the conventional technology.

Also, of information concerning a plurality of routes constituting a multipath each at the same cost, a routing table 19 is constructed according to route information for giving permission of a relay, and also constructs the RIP deletion table 73 according to route information for not giving permission of a relay, so that, of the information concerning a plurality of routes constituting a multipath each at the same cost, a frame can be transmitted only through a unique route according to the routing table, and frames for the other routes can be abandoned according to the non-routing table.

Also, when the route information included in the received frame is included in the RIP deletion table 73, the route information is deleted and the frame without the route information is transmitted, so that a plurality of routes constituting a multipath each at the same cost having existed at the time of reception of the frame disappears at the stage of frame transmission, and a unique route on the system can be notified to the network.

Also, it is possible to construct a high-reliability system by maintaining the compatibility with each routing even under the condition of forming a multipath at the same cost for realizing cost performance of the system as a whole without being caught by the relaying method.

Also, when a frame related to the multipath at the same cost is received from each of the networks, deletion of any of entries in the received frame or frame transmission following the entry (entries) is executed according to whether destination information as well as the cost for each of the entries in the received frame are identified to those in the routing table or not, so that frame transmission through a multipath at the same cost can be controlled for each route according to the destination.

Also, a frame is transparently relayed without rewriting the frame as a whole and a route can be decided only by conforming the destination, so that it is possible to realize cost performance of the apparatus as a whole without being caught by the transmission method applied to the OSI layers based on the conventional technology. The cost performance means here that both high performance of a switching hub and high functioning of a router are effected and also the apparatus with cost as low as that of the switching hub and router can be provided.

In the embodiment, although the transmission apparatus for transparently relaying a frame for a routing protocol without being rewritten has been mentioned, the present invention includes a method of transparently relaying an ARP frame without being rewritten similarly to the frame for a routing protocol.

In the embodiment, although a route to be stored in the RIP deletion table 73 is defined based on a smaller number of source IP addresses, the present invention is not limited thereto, and the reverse case may be employed.

Although the invention has been described with respect to a specific embodiment for a clear and a complete disclosure, the applied claims are not to be thus limited but are to be construed as embodying all modifications and alternative constructions that may occur to one skilled in the art which fairly fall within the basic teaching herein set forth.

As described above, with the transmission apparatus according to the present invention, a plurality of routes are previously formed in the network transmission system, and if there exists information concerning a plurality of routes constituting a multipath each at the same cost among the route information including cost information stored in correlation to the destination information, by using information for any one of the plurality of routes, the route is fixedly used for relaying, so that a unique route is notified to networks connected to each other through the transmission apparatus so that information for only one route can be seen, and with this feature, it is possible to obtain a transmission apparatus which can realize high-reliability communications by maintaining the compatibility with each routing even under the condition of forming a multipath at the same cost for realizing cost performance of the apparatus as a whole without being caught by the transmission method applied to the OSI layers based on the conventional technology.

With the transmission apparatus according to the present invention, a plurality of routes are previously formed in the network transmission system, and when information concerning a plurality of routes constituting a multipath each at the same cost is constructed by received control information, information for a route to be used for relaying is constructed according to information for any one of the plurality of routes, so that a unique route can be given to the system even if a plurality of routes constituting a multipath each at the same cost exist, and with this feature, it is possible to obtain a transmission apparatus which can realize high-reliability communications by maintaining the compatibility with each routing even under the condition of forming a multipath at the same cost for realizing cost performance of the apparatus as a whole without being caught by the transmission method applied to the OSI layers based on the conventional technology.

With the transmission apparatus according to the present invention, a plurality of routes are previously formed in the network transmission system, and when information concerning a plurality of routes constituting a multipath each at the same cost is constructed by a received routing protocol, information for a route to be used for relaying is constructed according to information for any one of the plurality of routes, so that a unique route can be given to the system even if a plurality of routes constituting a multipath each at the same cost exist, and with this feature, it is possible to obtain a transmission apparatus which can realize high-reliability communications by maintaining the compatibility with each routing even under the condition of forming a multipath at the same cost for realizing cost performance of the apparatus as a whole without being caught by the transmission method applied to the OSI layers based on the conventional technology.

With the transmission apparatus according to the present invention, of information concerning a plurality of routes constituting a multipath each at the same cost, a routing table is constructed according to route information for giving permission of a relay, and also constructs a non-routing table according to route information for not giving permission of a relay, so that, of the information concerning a plurality of routes constituting a multipath each at the same cost, a frame can be transmitted only through a unique route according to the routing table, and route information for the other routes is deleted according to the non-routing table, so that it is possible to obtain a transmission apparatus which can coincide contents of a routing table in a peripheral router with contents of a routing table in a transmission apparatus.

With the transmission apparatus according to the present invention, when the route information included in the received frame is included in the non-routing table, the route information is deleted and the frame without the route information is transmitted, so that it is possible to obtain a transmission apparatus in which the information concerning a plurality of routes constituting a multipath each at the same cost having existed at the time of reception of the frame disappears at the stage of frame transmission, and a unique route on the system can be notified to the network.

With the network transmission system according to the present invention, a plurality of routes are previously formed with a tree structure or a loop structure comprising a plurality of replay apparatuses in the network transmission system, and when information concerning a plurality of routes constituting a multipath each at the same cost exists among the route information including cost information stored in correlation to the destination information in each of the transmission apparatus, by using information for any one of the plurality of routes, the route is fixedly used for relaying, so that a unique route is notified to networks connected to each other through the transmission apparatus so that information for only one route can be seen, and with this feature, it is possible to obtain a network transmission system which can construct a high-reliability system by maintaining the compatibility with each routing even under the condition of forming a multipath at the same cost for realizing cost performance of the system as a whole without being caught by the transmission method applied to the OSI layers based on the conventional technology.

With the network transmission system according to the present invention, a plurality of routes are previously formed with a tree structure or a loop structure comprising a plurality of replay apparatuses in the network transmission system, and when information concerning a plurality of routes constituting a multipath each at the same cost is constructed by the received control information in each of the transmission apparatus, information for a route to be used for relaying is constructed according to information for any one of the plurality of routes, so that a unique route can be given to the system even if a plurality of routes constituting a multipath each at the same cost exist, and with this feature, it is possible to obtain a network transmission system which can construct a high-reliability system by maintaining the compatibility with each routing even under the condition of forming a multipath at the same cost for realizing cost performance of the system as a whole without being caught by the transmission method applied to the OSI layers based on the conventional technology.

With the network transmission system according to the present invention, a plurality of routes are previously formed with a tree structure or a loop structure comprising a plurality of replay apparatuses in the network transmission system, and when information concerning a plurality of routes constituting a multipath each at the same cost is constructed by the received routing protocol in each of the transmission apparatus, information for a route to be used for relaying is constructed according to information for any one of the plurality of routes, so that a unique route can be given to the system even if a plurality of routes constituting a multipath each at the same cost exist, and with this feature, it is possible to obtain a network transmission system which can construct a high-reliability system by maintaining the compatibility with each routing even under the condition of forming a multipath at the same cost for realizing cost performance of the system as a whole without being caught by the transmission method applied to the OSI layers based on the conventional technology.

With the transmission method according to the present invention, there are steps of executing, when having received a frame related to the multipath at the same cost from each of networks, deletion of any of entries in the received frame or transmission of the frame following the entry (entries) according to whether destination information as well as the cost for each of the entries are identified to those in the routing table or not, so that frame transmission through a multipath at the same cost can be controlled for each route according to the destination, and with this feature, it is possible to obtain a transmission method which can realize high-reliability communications by maintaining the compatibility with each routing even under the condition of forming a multipath at the same cost.

This application is based on Japanese patent application No. HEI 10-005719 filed in the Japanese Patent Office on Jan. 14, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A transmission apparatus, applied to a network transmission system that includes plural communication devices, for transmitting frames among said communication devices, each frame containing at least information related to destination of the frame, said transmission apparatus comprising:
   a route storage unit which stores at least information about path/s from said transmission apparatus up to each communication device and cost conditions for each path;
   a routing control unit which identifies a destination communication device based on the destination information included in a received frame, and which decides a path for transmitting the frame based on the information stored in said route storage unit such that each of the communication devices uses the same path, wherein when there exist multiple paths in said route storage unit corresponding to said identified destination communication device and that all the paths have same-cost condition, said routing control unit decides one path as a path for transmitting the frame; and
   a transmission unit which transmits the frame to said destination communication device along the path decided by said routing control unit.

2. A transmission apparatus, applied to a network transmission system that includes plural networks each containing plural communication devices, for transmitting frames among said communication devices, each frame containing at least information related to destination of the frame, said transmission apparatus comprising:
   a route storage unit which stores at least information about path/s from said transmission apparatus up to each communication device and cost conditions for each path;
   a structure unit which, when receiving a frame which includes control information, identifies the control information included in the received frame, and structures content of said route storage unit based on the identified control information; and
   a transmission unit which identifies the destination communication device based on the destination information included in the frame, decides a path for transmitting the frame based on the information stored in said route storage unit, and transmits the frame to said destination communication device along the decided path,
   wherein said structure unit, when said transmission unit identifies that there exist multiple paths in said route storage unit corresponding to said destination communication device and that all the paths have same-cost condition, decides one path, and structures content of said route storage unit based on the decided path such that the frame is transmitted to said destination communication device along the decided path.

3. The transmission apparatus according to claim 2, wherein said structure unit structures, in said route storage unit,
   a routing table that includes path information related to paths along which transmission of the frame is permitted; and
   a non-routing table that includes path information related to paths along which transmission of the frame is not permitted.

4. The transmission apparatus according to claim 3, wherein when a path identified from the path information included in the received frame is included in the non-routing table, then the path information included in the frame is deleted and the frame is transmitted to said destination communication device.

5. A transmission apparatus, applied to a network transmission system that includes plural networks each containing plural communication devices, for transmitting frames among said communication devices, each frame containing at least information related to destination of the frame, said transmission apparatus comprising:
   a route storage unit which stores at least information about path/s from said transmission apparatus up to each communication device and cost conditions for each path;
   a structure unit which, when receiving a frame which includes a routing information protocol, identifies the routing information protocol included in the received frame, and structures content of said route storage unit based on the identified information routing protocol; and
   a transmission unit which identifies the destination communication device based on the destination information included in the frame, decides a path for transmitting the frame based on the information stored in said route storage unit, and transmits the frame to said destination communication device along the decided path,
   wherein said structure unit, when said transmission unit identifies that there exist multiple paths in said route storage unit corresponding to said destination communication device and that all the paths have same-cost condition, decides one path, and structures content of said route storage unit based on the decided path such that the frame is transmitted to said destination communication device along the decided path.

6. The transmission apparatus according to claim 5, wherein said structure unit structures, in said route storage unit,
   a routing table that includes path information related to paths along which transmission of the frame is permitted; and
   a non-routing table that includes path information related to paths along which transmission of the frame is not permitted.

7. The transmission apparatus according to claim 6, wherein when a path identified from the path information included in the received frame is included in the non-routing table, then the path information included in the frame is deleted and the frame is transmitted to said destination communication device.

8. A network transmission system comprising:
   plural networks each containing mutually connected plural communication devices; and
   plural transmission apparatuses for transmitting frames among said communication devices, each frame containing at least information related to destination of the frame, each of said transmission apparatuses including,
   a route storage unit which stores at least information about path/s from said transmission apparatus up to each communication device and cost conditions for each path;
   a routing control unit which identifies a destination communication device based on the destination information included in a received frame, and which decides a path for transmitting the frame based on the information stored in said route storage unit such that each of the communication devices uses the same path, wherein when there exist multiple paths in said route storage unit corresponding to said identified destination communication device and that all the paths have same-cost condition, said routing control unit decides one path as a path for transmitting the frame; and a transmission unit which transmits the frame to said destination communication device along the path decided by said routing control unit.

9. A network transmission system comprising:

plural networks each containing mutually connected plural communication devices; and plural transmission apparatuses for transmitting frames among said communication devices, each frame containing at least information related to destination of the frame, each of said transmission apparatuses including,
- a route storage unit which stores at least information about path/s from said transmission apparatus up to each communication device and cost conditions for each path;
- a structure unit which, when receiving a frame which includes control information, identifies the control information included in the received frame, and structures content of said route storage unit based on the identified control information; and
- a transmission unit which identifies the destination communication device based on the destination information included in the frame, decides a path for transmitting the frame based on the information stored in said route storage unit, and transmits the frame to said destination communication device along the decided path,
- wherein said structure unit, when said transmission unit identifies that there exist multiple paths in said route storage unit corresponding to said destination communication device and that all the paths have same-cost condition, decides one path, and structures content of said route storage unit based on the decided path such that the frame is transmitted to said destination communication device along the decided path.

10. The network transmission system according to claim 9, wherein said structure unit in each of said transmission apparatus structures, in respective said route storage unit,
- a routing table that includes path information related to paths along which transmission of the frame is permitted; and
- a non-routing table that includes path information related to paths along which transmission of the frame is not permitted.

11. The network transmission system according to claim 10, wherein when a path identified from the path information included in the received frame is included in the non-routing table, then the path information included in the frame is deleted and the frame is transmitted to said destination communication device.

12. A network transmission system comprising:

plural networks each containing mutually connected plural communication devices; and plural transmission apparatuses for transmitting frames among said communication devices, each frame containing at least information related to destination of the frame, each of said transmission apparatuses including,
- a route storage unit which stores at least information about path/s from said transmission apparatus up to each communication device and cost conditions for each path;
- a structure unit which, when receiving a frame which includes a routing information protocol, identifies the routing information protocol included in the received frame, and structures content of said route storage unit based on the identified information routing protocol; and
- a transmission unit which identifies the destination communication device based on the destination information included in the frame, decides a path for transmitting the frame based on the information stored in said route storage unit, and transmits the frame to said destination communication device along the decided path,
- wherein said structure unit, when said transmission unit identifies that there exist multiple paths in said route storage unit corresponding to said destination communication device and that all the paths have same-cost condition, decides one path, and structures content of said route storage unit based on the decided path such that the frame is transmitted to said destination communication device along the decided path.

13. The network transmission system according to claim 12, wherein said structure unit in each of said transmission apparatus structures, in respective said route storage unit,
- a routing table that includes path information related to paths along which transmission of the frame is permitted; and
- a non-routing table that includes path information related to paths along which transmission of the frame is not permitted.

14. The network transmission system according to claim 13, wherein when a path identified from the path information included in the received frame is included in the non-routing table, then the path information included in the frame is deleted and the frame is transmitted to said destination communication device.

15. A method of transmitting frames among mutually connected plural communication devices included in a network, each frame including at least one entry, each entry identifying a path to a destination communication device for the frame and identifying a corresponding cost condition, there existing multiple paths for transmitting the frame to the destination communication device and all the paths having the same cost condition, the method comprising:

extracting an entry from a received frame;

based on a routing table that includes information about at least one path to each communication device and cost conditions for each path, comparing the entry extracted with the information in the routing table and judging whether there is a match;

if the path and cost conditions match, deleting the entry from the received frame; and if the path and cost conditions do not match, transmitting the frame to the communication device identified in the entry.

* * * * *